United States Patent
Jeon et al.

(10) Patent No.: US 12,001,885 B2
(45) Date of Patent: *Jun. 4, 2024

(54) CONTROLLER AND MEMORY SYSTEM INCLUDING THE CONTROLLER OPERATING MEMORY ALLOCATION

(71) Applicant: SK hynix Inc., Icheon-si (KR)

(72) Inventors: Duk Joon Jeon, Yongin-si (KR); Changhwan Youn, Seongnam-si (KR)

(73) Assignee: SK hynix Inc., Icheon-si (KR)

(*) Notice: Subject to any disclaimer, the term of this patent is extended or adjusted under 35 U.S.C. 154(b) by 176 days.

This patent is subject to a terminal disclaimer.

(21) Appl. No.: 17/328,838

(22) Filed: May 24, 2021

(65) Prior Publication Data
US 2021/0279106 A1    Sep. 9, 2021

Related U.S. Application Data

(63) Continuation of application No. 16/598,560, filed on Oct. 10, 2019, now Pat. No. 11,030,008.

(30) Foreign Application Priority Data

Mar. 5, 2019 (KR) .................... 10-2019-0025327

(51) Int. Cl.
*G06F 9/50* (2006.01)
*G06F 12/02* (2006.01)
*G06F 12/06* (2006.01)

(52) U.S. Cl.
CPC .......... *G06F 9/5016* (2013.01); *G06F 9/5022* (2013.01); *G06F 12/0246* (2013.01); *G06F 12/063* (2013.01); *G06F 2212/7201* (2013.01)

(58) Field of Classification Search
CPC .. G06F 9/5016; G06F 9/5022; G06F 12/0246; G06F 12/063; G06F 2212/7201;
(Continued)

(56) References Cited

U.S. PATENT DOCUMENTS 10,223,254 B1    3/2019  Frolikov
11,030,008 B2 *  6/2021  Jeon ..................... G06F 9/5022
(Continued)

FOREIGN PATENT DOCUMENTS

CN    102576333 A    7/2012
CN    105847456 A    8/2016
(Continued)

OTHER PUBLICATIONS

Po-Liang Wu et al., A file-system-aware FTL design for flash-memory storage systems, 2009, Design, Automation & Test in Europe Conference & Exhibition.
(Continued)

*Primary Examiner* — Tasnima Matin
(74) *Attorney, Agent, or Firm* — WILLIAM PARK & ASSOCIATES LTD.

(57) ABSTRACT

The present technology includes a controller including an allocation manager configured to determine whether a host identification (ID) output from a host is an allocable ID, an address manager configured to perform an allocation operation using the host ID to select logical blocks corresponding to the host ID when the host ID is received from the allocation manager, and output an address of the logical blocks as an allocation address, and a map table component configured to store a map table in which logical block addresses and physical block addresses are respectively mapped, select a logical block address corresponding to the allocation address, and output the physical block address mapped to the selected logical block address, a memory system including the controller, and a method of operating the memory system.

18 Claims, 22 Drawing Sheets

(58) Field of Classification Search
CPC .... G06F 12/023; G06F 3/0611; G06F 3/0658; G06F 2212/7202
See application file for complete search history.

(56) References Cited

U.S. PATENT DOCUMENTS

| | | |
|---|---|---|
| 2008/0307156 A1 | 12/2008 | Sinclair |
| 2013/0262747 A1 | 10/2013 | Chang |
| 2013/0346635 A1 | 12/2013 | Morriss et al. |
| 2013/0346782 A1 | 12/2013 | Thielo et al. |
| 2014/0164677 A1 | 6/2014 | Borchers et al. |
| 2015/0268859 A1 | 9/2015 | Mori |
| 2016/0085467 A1* | 3/2016 | Saxena ............... G06F 11/2071 714/766 |
| 2018/0089101 A1 | 3/2018 | Sternberg et al. |
| 2018/0121121 A1 | 5/2018 | Mehra et al. |
| 2018/0276115 A1* | 9/2018 | Shoji .................... G11C 8/16 |
| 2019/0121547 A1 | 4/2019 | Frolikov |
| 2020/0285519 A1 | 9/2020 | Jeon et al. |
| 2022/0156000 A1* | 5/2022 | Inbar .................... G06F 3/0658 |

FOREIGN PATENT DOCUMENTS

| | | |
|---|---|---|
| CN | 106776353 A | 5/2017 |
| KR | 1020170122090 A | 11/2017 |
| KR | 101824949 B1 | 2/2018 |
| KR | 101861851 B1 | 5/2018 |

OTHER PUBLICATIONS

Guo-Xiang Zhong et al., Design of the Model of the Management System Based on Active Network, China Academic Journal Electronic Publishing House, 2007, vol. 34, No. 11.

* cited by examiner

| Total Capacity | 32GB | | |
|---|---|---|---|
| Host ID Policy -1 | 32GB | | |
| Host ID Policy -2 | 16GB (1H#) | 16GB (2H#) | |
| Host ID Policy -3 | 16GB (1H#) | 8GB (2H#) | 8GB (3H#) |

Host ID Policy -2

| 1H#/2H# | 1LBi+2LBi | capacity |
|---|---|---|
| H1/H10 | LB0~LB3 + LB4, LB5 | 16GB + 8GB |
| H1/H12 | LB0~LB3 + LB4 | 16GB + 4GB |
| H2/H9 | LB0, LB1 + LB4~LB7 | 8GB + 16GB |

CONTROLLER AND MEMORY SYSTEM INCLUDING THE CONTROLLER OPERATING MEMORY ALLOCATION

CROSS-REFERENCE TO RELATED APPLICATION

The present application is a continuation application of U.S. patent application Ser. No. 16/598,560, filed on Oct. 10, 2019, and claims priority under 35 U.S.C. § 119(a) to Korean patent application number 10-2019-0025327, filed on Mar. 5, 2019, in the Korean Intellectual Property Office, the entire disclosure of which is incorporated herein by reference.

BACKGROUND

1. Technical Field

The present disclosure generally relates to a controller, a memory system including the controller, and a method of operating the memory system, and more particularly, to a controller, a memory system including the controller, and a method of operating the memory system, related to allocating memory blocks included in a memory system according to a request of a host.

2. Related Art

An electric system may include a memory system in which data is stored, and a host that stores data in the memory system or reads stored data.

The memory system may include a storage device in which data is substantially stored and a controller that controls the storage device. The storage device may include at least one memory device.

The memory device may be divided into a volatile memory device and a nonvolatile memory device. The volatile memory device is a memory device in which stored data is lost when power supply is interrupted, and the nonvolatile memory device is a memory device in which stored data is retained even though power supply is interrupted.

Of these, the nonvolatile memory device is widely used in a portable electronic system because of characteristics of retaining data without power supply and characteristics of ease of miniaturization and large capacity. For example, the nonvolatile memory device is used in an electronic system such as a cellular phone, a notebook, a camcorder, and a digital camera, and is used as a main storage device of a solid state drive (SSD) that is a storage system capable of replacing a hard disk.

The host may communicate with the memory system using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM).

Recently, as a range of use of an electronic system is widening, the host may request a large capacity of storage space allocation to the memory system.

In general, the host may request allocation using a logical block address of the memory system. For example, the host may transmit start and end addresses of the logical block address (LBA) to the memory system in order to receive the allocation of a required storage capacity, and the memory system may allocate memory blocks corresponding to the logical block address received from the host.

However, due to the large capacity of the memory system, the number of bits indicating the logical block address is increasing, which may increase an operation time of mapping a logical block address and a physical block address in the memory system.

SUMMARY

A controller according to an embodiment of the present disclosure may include an allocation manager configured to determine whether a host identification (ID) output from a host is an allocable ID, an address manager configured to perform an allocation operation using the host ID to select logical blocks corresponding to the host ID when the host ID is received from the allocation manager, and output an address of the logical blocks as an allocation address, and a map table component configured to store a map table in which logical block addresses and physical block addresses are respectively mapped, select a logical block address corresponding to the allocation address, and output the physical block address mapped to the selected logical block address.

A controller according to an embodiment of the present disclosure may include a processor configured to map physical block addresses corresponding to free memory blocks to logical block addresses so that the free memory blocks that are operable simultaneously with each other are included in the same tree, an address allocator configured to perform an allocation operation based on a configuration of the tree to select logical blocks corresponding to a host ID and output addresses of the free memory blocks mapped to addresses of the logical blocks, and a memory interface that accesses physical blocks corresponding to addresses of the free memory blocks.

A memory system according to an embodiment of the present disclosure may include a plurality of memory blocks, and a controller configured to receive a host ID according to a host ID policy in which the memory blocks are divided into logical block units, calculate an allocation address based on the received host ID, and access allocated memory blocks among the memory blocks according to physical block addresses mapped to the allocation address.

A method of operating a memory system according to an embodiment of the present disclosure may include calculating a start node and the number of logical blocks by performing an allocation operation using a host ID when the host ID divided into logical block units is received, generating an address of the logical blocks allocated according to the start node and the number as an allocation address, detecting a physical block address mapped to the allocation address, and allocating memory blocks according to the physical block address.

DETAILED DESCRIPTION

The advantages and features of the present disclosure, and a method for accomplishing the advantages and features will be described through embodiments that are described in detail below with reference to the accompanying drawings. However, the present disclosure is not limited to the embodiments described herein but may be embodied in other forms. The present embodiments are provided to describe the technical spirit of the present disclosure in detail to those skilled in the art to which the present disclosure is pertains so that those skilled in the art may easily implement the technical spirit of the present disclosure.

Throughout the specification, in a case in which a portion is "connected" to another portion, the case includes not only a case in which the portion is "directly connected" to the other portion but also a case in which the portion is "indirectly connected" to the other portion with another element interposed therebetween. Throughout the specification, in a case in which a portion includes an element, the case means that the portion may include other elements without excluding other elements unless specifically stated otherwise.

An embodiment of the present disclosure may provide a controller, a memory system including the controller, and a method of operating the memory system, in which the memory system itself may manage an allocation space.

The present technology may efficiently manage a memory area of the memory system since the memory system itself rather than the host manages the allocation space. In addition, the present technology may reduce a memory allocation operation time according to a request of the host, by reducing the number of bits used for the allocation space operation.

Figure 1:
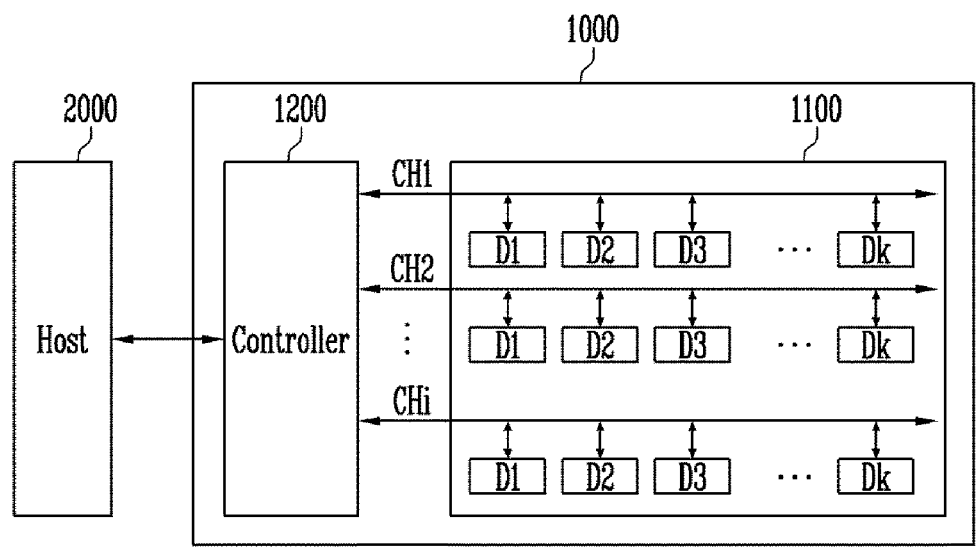
FIG. 1 is a diagram for describing a memory system according to the present disclosure.

FIG. 1 is a diagram for describing a memory system according to the present disclosure.

Referring to FIG. 1, the memory system 1000 may include a storage device 1100 in which data is stored and a controller 1200 that controls the storage device 1100.

The storage device 1100 may include a plurality of dies D1 to Dk (k is a positive integer). The dies D1 to Dk may be implemented as a volatile memory device in which the stored data is lost when power supply is interrupted or a nonvolatile memory device in which the stored data is retained even though the power supply is interrupted. In the following embodiment, a memory system including the dies D1 to Dk implemented as the nonvolatile memory device will be described as an example. The nonvolatile memory device may be a NAND flash memory device.

The storage device 1100 may communicate with the controller 1200 through a plurality of channels CH1 to CHi (i is a positive integer). For example, the dies D1 to Dk included in the storage device 1100 may receive a command, an address, data, and the like from the controller 1200 and output data to the controller 1200 through the channels CH1 to CHi.

The controller 1200 may control the storage device 1100 according to a request received from a host 2000 and may output the data read from the storage device 1100 to the host 2000. For example, when the controller 1200 receives a program request and data from the host 2000, the controller 1200 may store the received data in the storage device 1100. When the controller 1200 receives a read request and a logical block address from the host 2000, the controller 1200 may perform a read operation according to a physical block address mapped to the logical block address, and may output the read data to the host 2000.

In addition, the controller 1200 may perform a background operation capable of managing the storage device 1100 even though there is no request from the host 2000. For example, the controller 1200 may perform functions such as garbage collection and wear leveling, and may perform various functions for efficiently managing the storage device 1100.

In addition, the controller 1200 may allocate or release a memory in consideration of a state of the storage device 1100 according to an allocation request or a de-allocation request from the host 2000. To this end, the host 2000 may request an allocation capacity in a form of a host identification (ID), and the controller 1200 may allocate memory blocks included in the storage device 1100 according to an operation process that is embedded in the controller 1200.

The host 2000 may communicate with the memory system 1000 using an interface protocol such as peripheral component interconnect express (PCIe), advanced technology attachment (ATA), serial ATA (SATA), parallel ATA (PATA), serial attached SCSI (SAS), or a nonvolatile memory express (NVMe). The storage interface 2200 is not limited to the above example and may include various interfaces such as universal serial bus (USB), multi-media card (MMS), enhanced small disk interface (ESDI).

Figure 2:
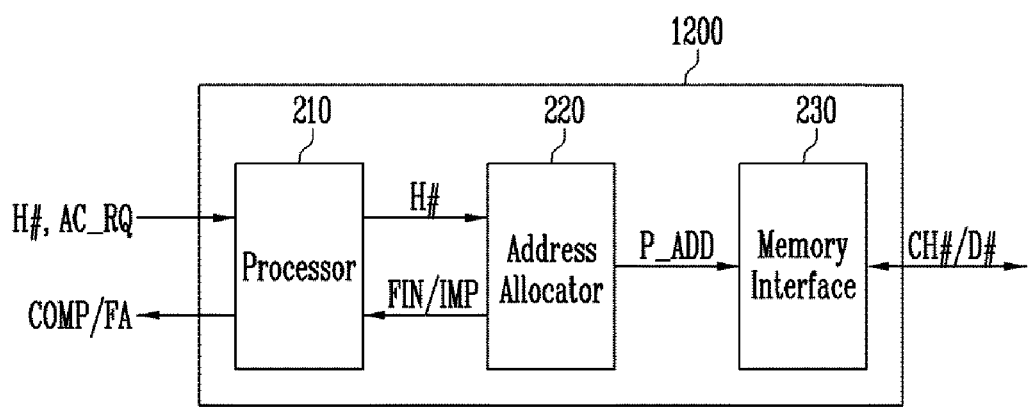
FIG. 2 is a diagram for describing a controller of FIG. 1.

FIG. 2 is a diagram for describing the controller of FIG. 1.

Referring to FIG. 2, the controller 1200 may include a processor 210, an address allocator 220, and a memory interface 230.

The processor 210 may receive an allocation request AC_RQ and a host ID H # from the host 2000 and may perform an allocation process according to the allocation request AC_RQ. For example, the processor 210 may transmit the host ID H # to the address allocator 220 according to the allocation request AC_RQ, and may output an allocation completion signal COMP or a fail signal FA to the host 2000 in response to an allocation impossible signal IMP.

The address allocator 220 may determine whether it is allocable according to the host ID H # received from the processor 210 and output the allocation completion signal FIN or the allocation impossible signal IMP, and when the memory allocation is possible, the address allocator 220 may output an allocated physical block address P_ADD. The address allocator 220 may determine whether the host ID H # is an allocable ID, and when the host ID H # is unallocable, the address allocator 220 may output the allocation impossible signal IMP. For example, the unallocable case may include a case in which the host ID H # exceeds a capacity of the storage device 1100 or the number of allocable free memory blocks is less than a requested number. The allocable case may include a case in which the host ID H # does not exceed the capacity of the storage device 1100 and a previously allocated log information is present or the number of allocable free memory blocks is equal to or greater than the requested number.

The memory interface 230 may select the channel CH # and the die D # according to the physical block address P_ADD received from the address allocator 220 and access the selected die.

Each of the configurations described above with reference to FIGS. 1 and 2 will be described below as follows.

Figure 3:
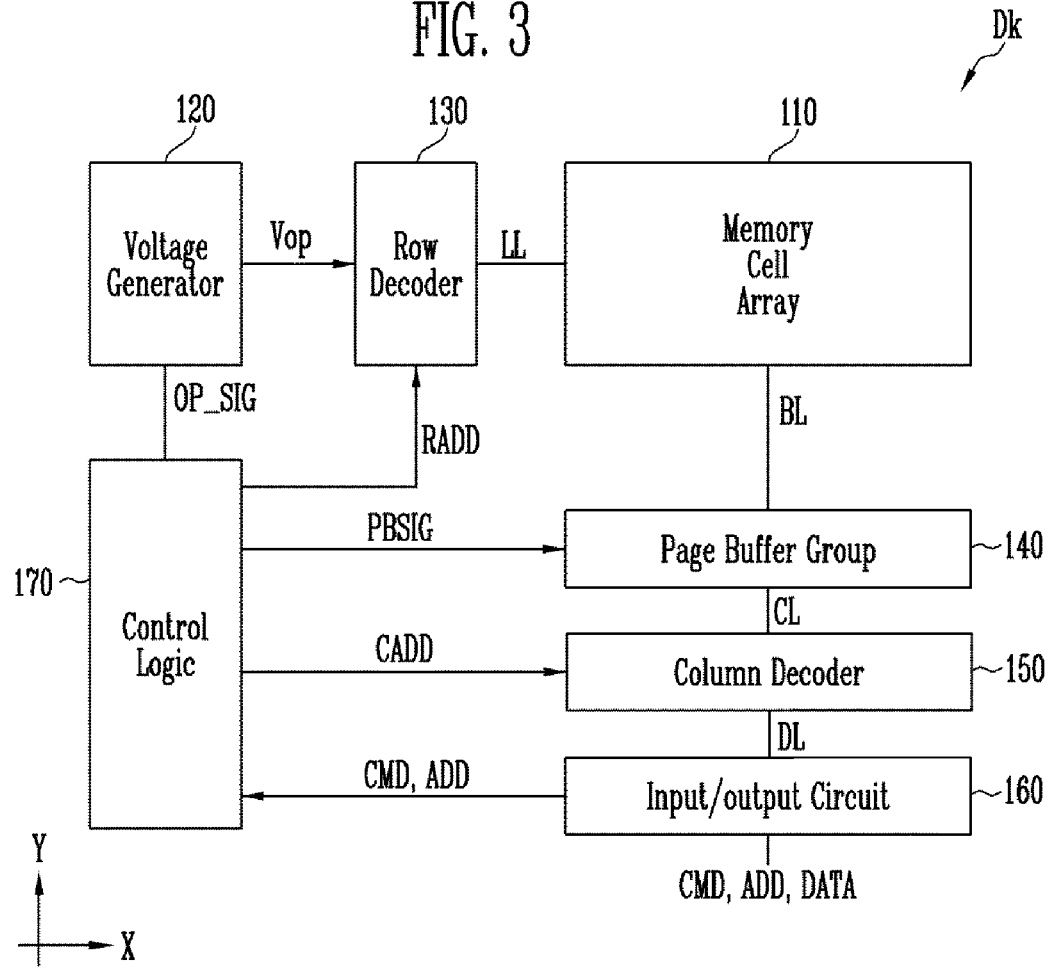
FIG. 3 is a diagram for describing a die of FIG. 1.

FIG. 3 is a diagram for describing the die of FIG. 1.

Since the first to k-th dies D1 to Dk may be configured to be identical to each other, the k-th die Dk will be described as an example in FIG. 3.

Referring to FIG. 3, the k-th die Dk may include a memory cell array 110 in which data is stored, peripheral circuits 120, 130, 140, 150 and 160 that perform a program, read, or erase operation, and control logic 170 that controls the peripheral circuits 120-160.

The memory cell array 110 may include a plurality of memory blocks in which data is stored. Each of the memory blocks includes a plurality of memory cells, and the memory cells may be implemented as a two-dimensional structure arranged parallel to a substrate or a three-dimensional structure stacked on the substrate in a vertical direction.

The peripheral circuits 120 to 160 may include a voltage generator 120, a row decoder 130, a page buffer group 140, a column decoder 150, and an input/output circuit 160.

The voltage generator 120 may generate and output operation voltages Vop required for various operations in response to an operation signal OP_SIG. For example, the voltage generator 120 may generate and output a program voltage, a verification voltage, a read voltage, a pass voltage, and an erase voltage.

The row decoder 130 may select one memory block among the memory blocks included in the memory cell array 110 according to a row address RADD and transmit operation voltages Vop through local lines LL of the selected memory block.

The page buffer group 140 may include a plurality of page buffers connected to bit lines BL and may temporarily store data at a time of a program or read operation in response to a page buffer control signal PBSIG. Each of the page buffers may include a plurality of latches for temporarily storing data at a time of program, read, and verification operations.

The column decoder 150 may be connected to the page buffer group 140 through column lines CL and may be connected to the input/output circuit 160 through data lines DL. For example, the column decoder 150 may transfers data received through the data lines DL to the page buffer group 140 at the time of the program operation or transfer data received through the column lines CL at the time of the read operation to the input/output circuit 160 through the data lines DL.

The input/output circuit 160 may be connected to the controller 1200 through input/output lines and may input/output a command CMD, an address ADD, and data DATA through the input/output lines. For example, at the time of the program operation, the input/output circuit 160 may transfer the command CMD and the address ADD received from the controller 1200 to the control logic 170 and transfer the data DATA to the column decoder 150. The column decoder 150 may sequentially transmit the data DATA to the page buffer group 140 according to a column address CADD. At the time of the read operation, the input/output circuit 160 may output the data DATA received from the column decoder 150 to the controller 1200.

Figure 4:
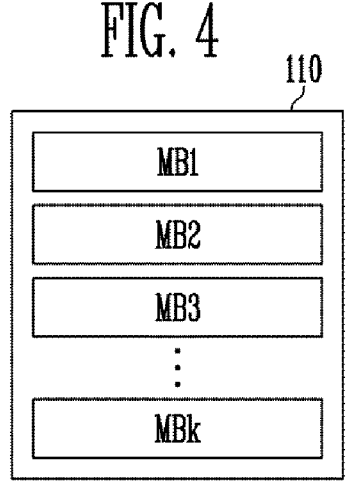
FIG. 4 is a diagram for describing a memory cell array of FIG. 3.

FIG. 4 is a diagram for describing the memory cell array of FIG. 3.

Referring to FIG. 4, the memory cell array 110 may include a plurality of memory blocks MB1 to MBk. The memory blocks MB1 to MBk may include a plurality of memory cells and may share bit lines (BL of FIG. 2) with each other.

The memory block will be described in below as follows.

Figure 5:
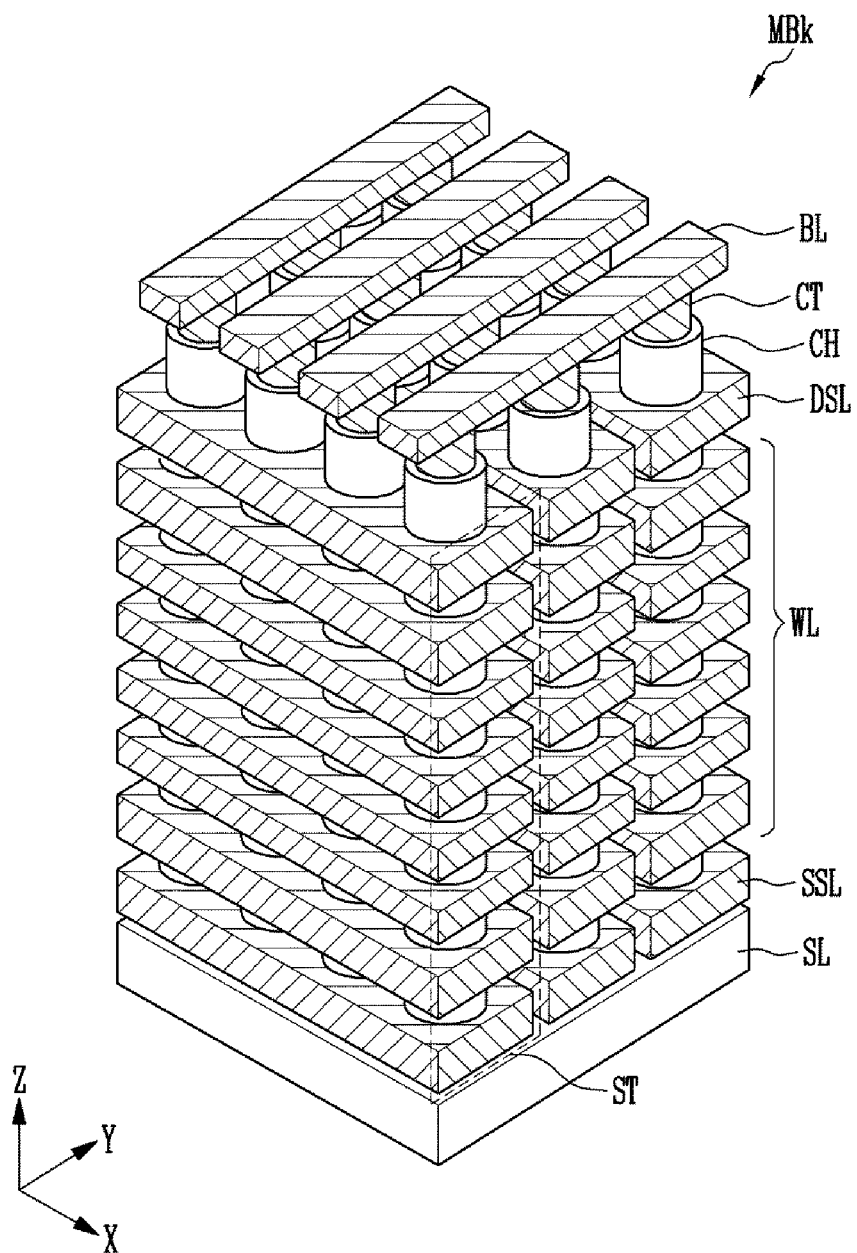
FIGS. 5 and 6 are diagrams for describing a memory block of a three-dimensional structure according to a first embodiment.
Figure 6:
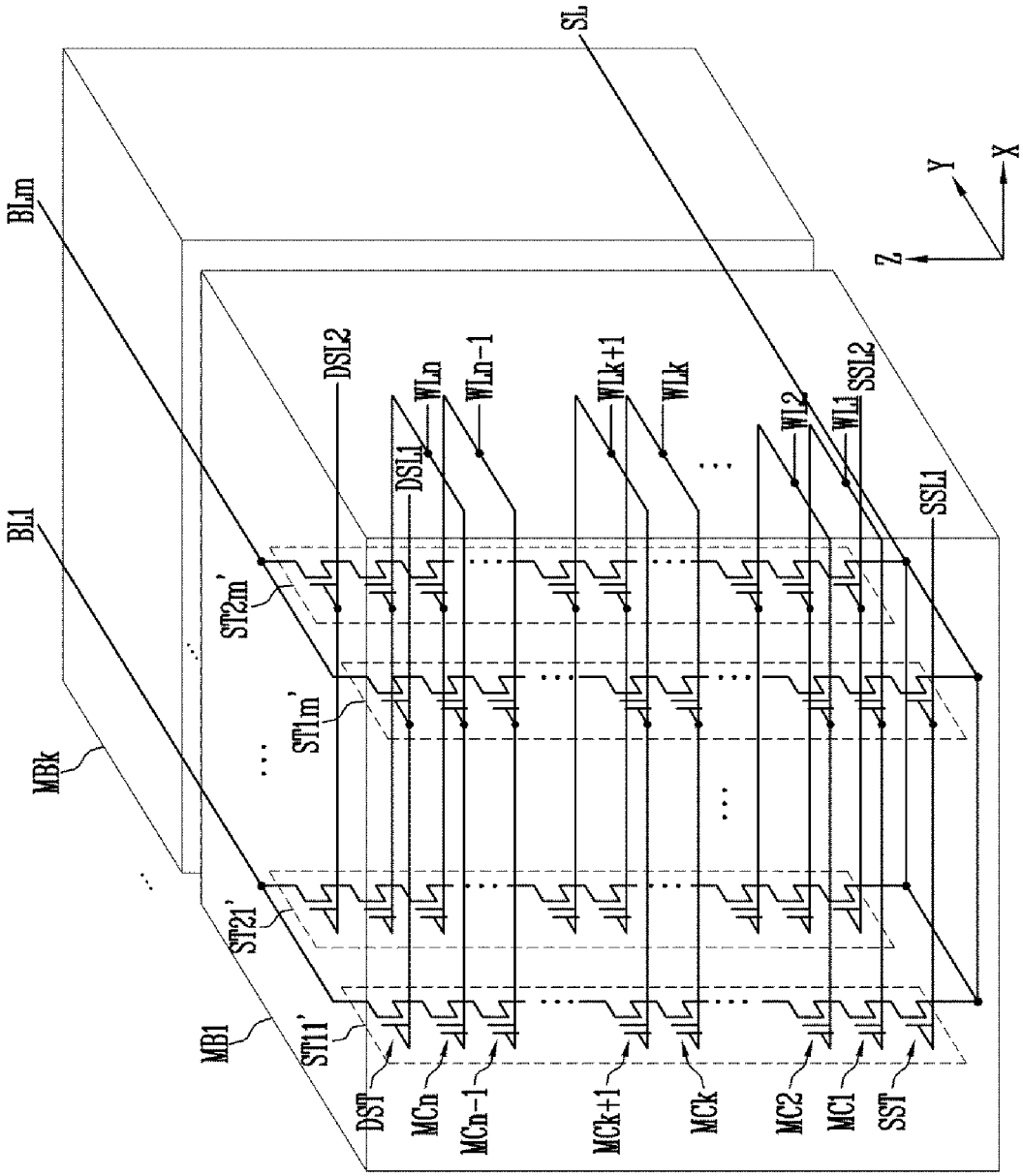

FIGS. 5 and 6 are diagrams for describing a memory block of a three-dimensional structure according to a first embodiment. FIG. 5 is a perspective view of the memory block, and FIG. 6 is a circuit diagram of the memory block.

Referring to FIG. 5, the k-th memory block MBk implemented in a three-dimensional structure may be formed in a vertical (Z direction) I shape on a substrate, and may include a plurality of cell strings ST arranged between bit lines BL and source lines SL. Alternatively, the cell strings ST may be connected to a well instead of the source line SL. Such a structure is also referred to as bit cost scalable (BiCS). For example, when the source line SL is horizontally formed on the substrate, the cell strings ST having the BiCS structure may be formed in the direction (Z direction) perpendicular to an upper portion the source line SL.

For example, the cell strings ST may be arranged in a first direction (X direction) and a second direction (Y direction), respectively. The cell strings ST may include source select lines SSL, word lines WL, and drain select lines DSL that are stacked and spaced apart from one another. The number of the source select lines SSL, the word lines WL, and the drain select lines DSL is not limited to the number shown in the drawing. The cell strings ST may include vertical channel films CH vertically passing through the source select lines SSL, the word lines WL, and the drain select lines DSL, and the bit lines BL that are in contact with an upper portion of the vertical channel films CH protruded to an upper portion of the drain select lines DSL and extending in the second direction (Y direction). The memory cells may be formed between the word lines WL and the vertical channel films CH. A contact plug CT may be further formed between the bit lines BL and the vertical channel films CH.

Referring to FIG. 6, the first memory block MB1 may include a plurality of cell strings ST11' to ST1m' and ST21' to ST2m'. Each of the plurality of cell strings ST11' to ST1m' and ST21' to ST2m' may extend along the vertical direction (Z direction), and m cell strings may be arranged in a row direction (X direction) in the first memory block MB1. In FIG. 6, two cell strings are arranged in a column direction (Y direction). However, this is for convenience of description, and three or more cell strings may be arranged in the column direction (Y direction).

Each of the plurality of cell strings ST11' to ST1m' and ST21' to ST2m' may include at least one source select transistor SST, first to n-th memory cells MC1 to MCn, and at least one drain select a transistor DST.

The source select transistor SST of each of the cell strings may be connected between the source line SL and the memory cells MC1 to MCn. The source select transistors SST of the cell strings arranged in the same row may be connected to the same source select line SSL1 or SSL2. The source select transistors SST of the cell strings ST11' to ST1m' arranged in a first row may be connected to a first source select line SSL1. The source select transistors of the strings ST21' to ST2m' arranged in a second row may be connected to a second source select line SSL2. As another embodiment, the source select transistors of the strings ST11' to ST1m' and ST21' to ST2m' may be commonly connected to one source select line.

The first to n-th memory cells MC1 to MCn of each of the cell strings may be connected in series between the source select transistor SST and the drain select transistor DST. Gates of the first to n-th memory cells MC1 to MCn may be connected to the first to n-th word lines WL1 to WLn, respectively. In addition, at least one of the first to n-th memory cells MC1 to MCn may be used as a dummy memory cell.

The drain select transistor DST of the cell strings may be connected between the bit line and the memory cells MC1 to MCn. The drain select transistors DST of the cell strings arranged in the row direction may be connected to a drain select line extending in the row direction. The drain select transistors DST of the cell strings ST11' to ST1m' of the first row may be connected to a first drain select line DSL1. The drain select transistors DST of the cell strings ST21' to ST2m' of the second row may be connected to a second drain select line DSL2.

Figure 7:
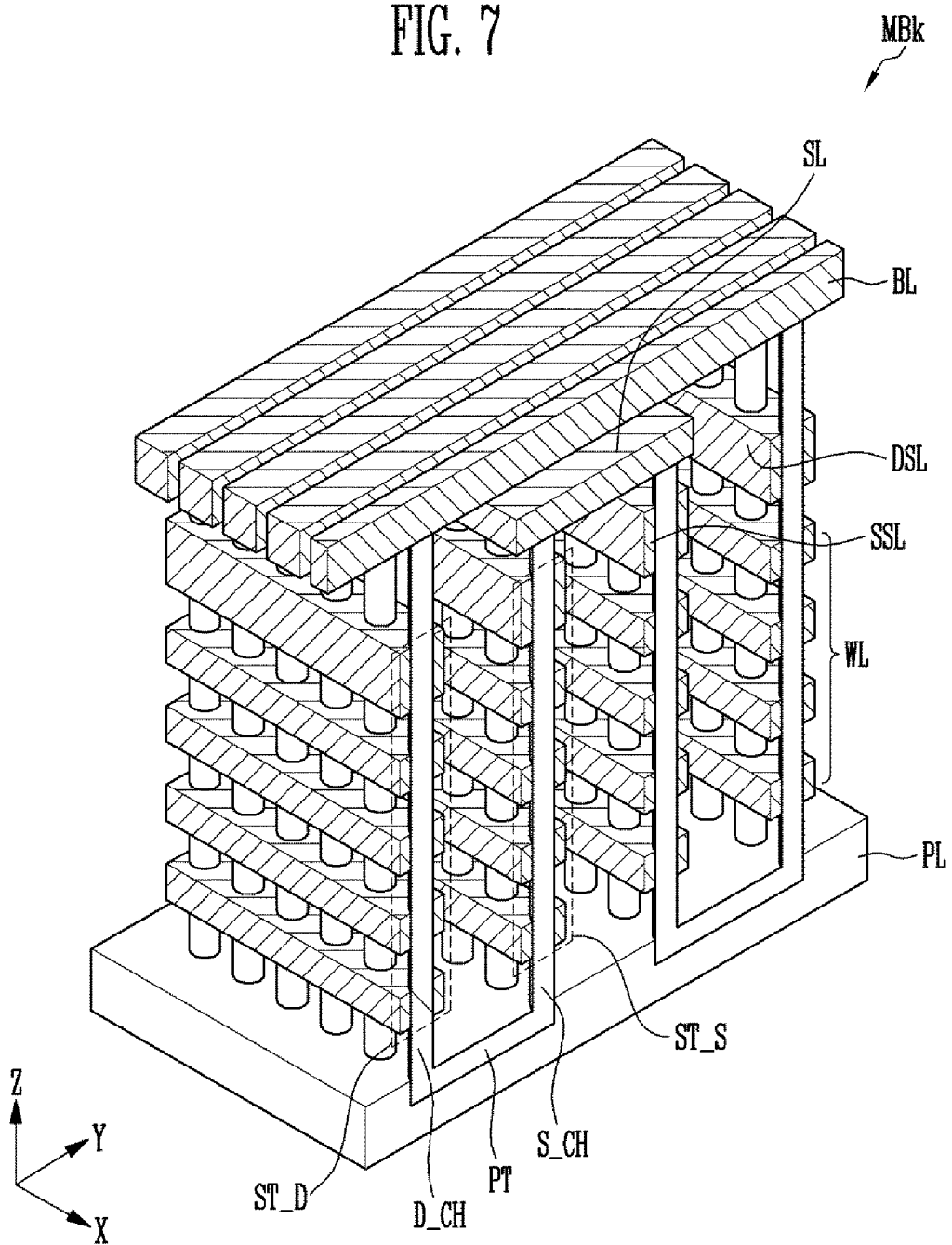
FIGS. 7 and 8 are diagrams for describing a memory block of a three-dimensional structure according to a second embodiment.
Figure 8:
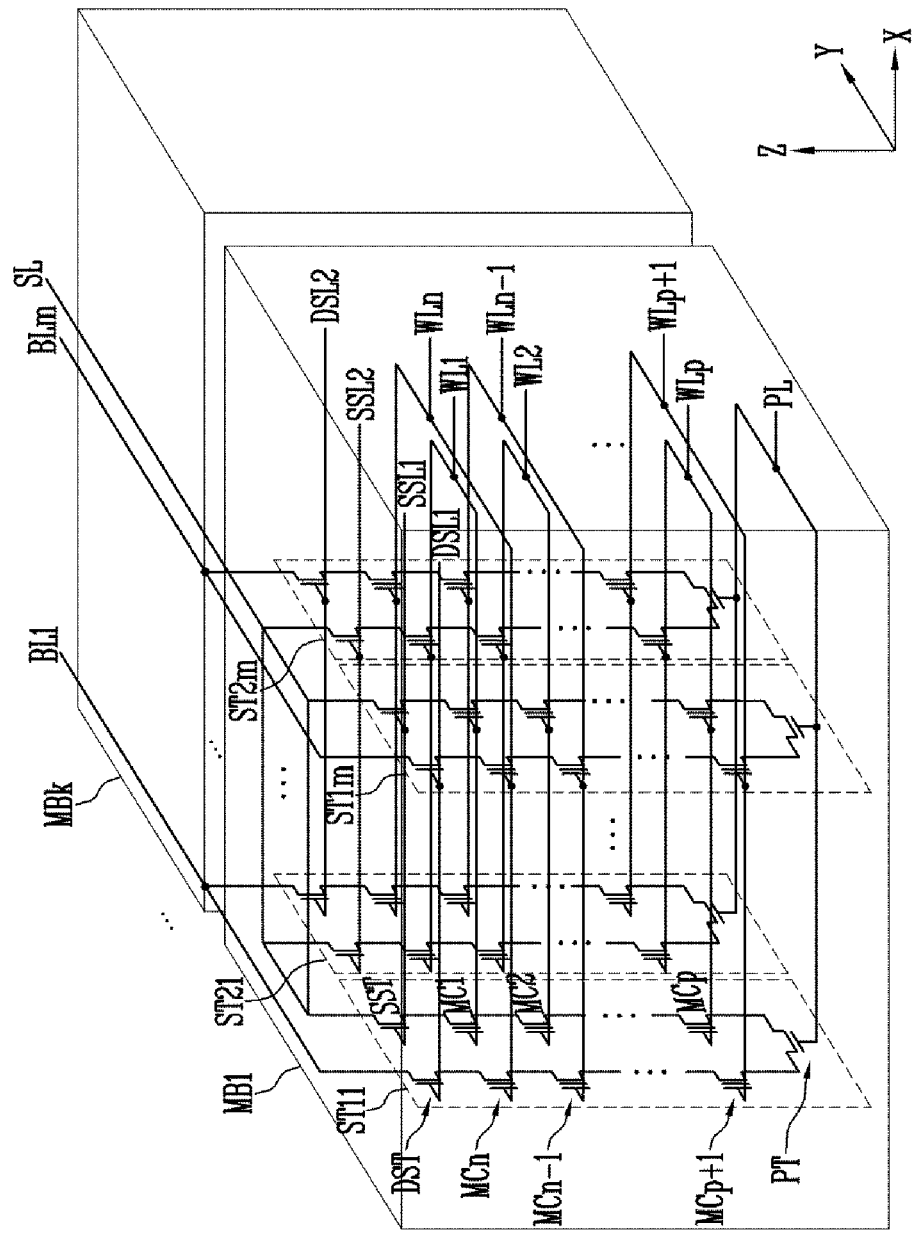

FIGS. 7 and 8 are diagrams for describing a memory block of a three-dimensional structure according to a second embodiment. FIG. 7 is a perspective view of the memory block, and FIG. 8 is a circuit diagram of the memory block.

Referring to FIG. 7, the k-th memory block MBk implemented in a three-dimensional structure may be formed in a U shape in a vertical direction (Z direction) on a substrate, and may include a pair of source strings ST_S and drain strings ST_D connected between the bit lines BL and the source lines SL. The source strings ST_S and the drain strings ST_D may be connected to each other through a pipe transistor PT to form a U-shaped structure. The pipe transistor PT may be formed in a pipeline PL. For example, the source strings ST_S may be vertically formed between the source lines SL and the pipeline PL, and the drain strings ST_D may be vertically formed between the bit lines BL and the pipelines PL. Such a structure is also referred to as pipe-shaped bit cost scalable (P-BiCS).

For example, the drain strings ST_D and the source strings ST_S may be arranged in the first direction (X direction) and the second direction (Y direction), respectively, and the drain strings ST_D and the source strings ST_S may be alternately arranged along the second direction Y. The drain strings ST_D may include the word lines WL and the drain select lines DSL that are stacked and spaced apart from each other, and drain vertical channel films D_CH vertically passing through the word lines WL and the drain select lines DSL. The source strings ST_S may include the word lines WL and the source select lines SSL that are stacked and spaced apart from each other, and source vertical channel films S_CH vertically passing through the word lines WL and the source select lines SSL. The drain vertical channel films D_CH and the source vertical channel films S_CH may be connected to each other by the pipe transistor PT in the pipeline PL. The bit lines BL may be in contact with an upper portion of the drain vertical channel films D_CH protruded to the upper portion of the drain select line DSL and may extend in the second direction (Y direction).

Referring to FIG. 8, the first memory block MB1 may include a plurality of cell strings ST11 to ST1m and ST21 to ST2m. Each of the plurality of cell strings ST11 to ST1m and ST21 to ST2m may be formed in a U shape. In the first memory block MB1, m strings may be arranged in the row direction (X direction). In FIG. 8, two cell strings are arranged in the column direction (Y direction), but this is for convenience of description, and three or more cell strings may be arranged in the column direction (Y direction).

Each of the plurality of cell strings ST11 to ST1m and ST21 to ST2m may include at least one source select transistor SST, first to n-th memory cells MC1 to MCn, the pipe transistor PT, and at least one drain select transistor DST.

The source and drain select transistors SST and DST and the memory cells MC1 to MCn may have similar structures. For example, each of the source and drain select transistors SST and DST and the memory cells MC1 to MCn may include a channel film, a tunnel insulating film, a charge trap film, and a blocking insulating film. For example, a pillar for providing the channel film may be provided in each string. For example, a pillar for providing at least one of the channel film, the tunnel insulating film, the charge trap film, and the blocking insulating film may be provided in each string.

The source select transistor SST of each of the cell strings may be connected between the source line SL and the memory cells MC1 to MCp.

As an embodiment, the source select transistors of the strings arranged in the same row may be connected to the source select line extending in the row direction, and the source select transistors of the cell strings arranged in different rows may be connected to different source select lines. In FIG. 8, the source select transistors of the strings ST1l to ST1m of the first row may be connected to the first source select line SSL1. The source select transistors of the cell strings ST21 to ST2m of the second row may be connected to the second source select line SSL2.

As another embodiment, the source select transistors of the cell strings ST11 to ST1m and ST21 to ST2m may be commonly connected to one source select line.

The first to n-th memory cells MC1 to MCn of the cell strings may be connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp may be sequentially arranged in the vertical direction (Z direction), and may be connected in series between the source select transistor SST and the pipe transistor PT. The (p+1)-th to n-th memory cells MCp+1 to MCn may be sequentially arranged in the vertical direction (Z direction), and may be connected in series between the pipe transistor PT and the drain select transistor DST. The first to p-th memory cells MC1 to MCp and the (p+1)-th to n-th memory cells MCp+1 to MCn may be connected to each other through the pipe transistor PT. Gates of the first to n-th memory cells MC1 to MCn of each string may be connected to the first to the n-th word lines WL1 to WLn, respectively.

As an embodiment, at least one of the first to n-th memory cells MC1 to MCn may be used as a dummy memory cell. When the dummy memory cell is provided, a voltage or a current of a corresponding string may be stably controlled. A gate of the pipe transistor PT of each string may be connected to the pipeline PL.

The drain select transistor DST of each string may be connected between the bit line and the memory cells MCp+1 to MCn. The strings arranged in the row direction may be connected to the drain select line extending in the row direction. The drain select transistors of the strings ST11 to ST1m of the first row may be connected to the first drain select line DSL1. The drain select transistors of the strings ST21 to ST2m of the second row may be connected to the second drain select line DSL2.

The cell strings arranged in the column direction may be connected to the bit lines extending in the column direction. In FIG. 8, the strings ST11 and ST21 of the first column may be connected to the first bit line BL1. The strings ST1m and ST2m of the m-th column may be connected to the m-th bit line BLm.

Among the cell strings arranged in the row direction, the memory cells connected to the same word line may configure one page. For example, the memory cells connected to the first word line WL1 among the strings ST11 to ST1m of the first row may configure one page. The memory cells connected to the first word line WL1 among the strings ST21 to ST2m of the second row may configure another page. The cell strings arranged in one row direction will be selected by selecting any one of the drain select lines DSL1 and DSL2. One page of the selected cell strings will be selected by selecting any one of the word lines WL1 to WLn.

Figure 9:
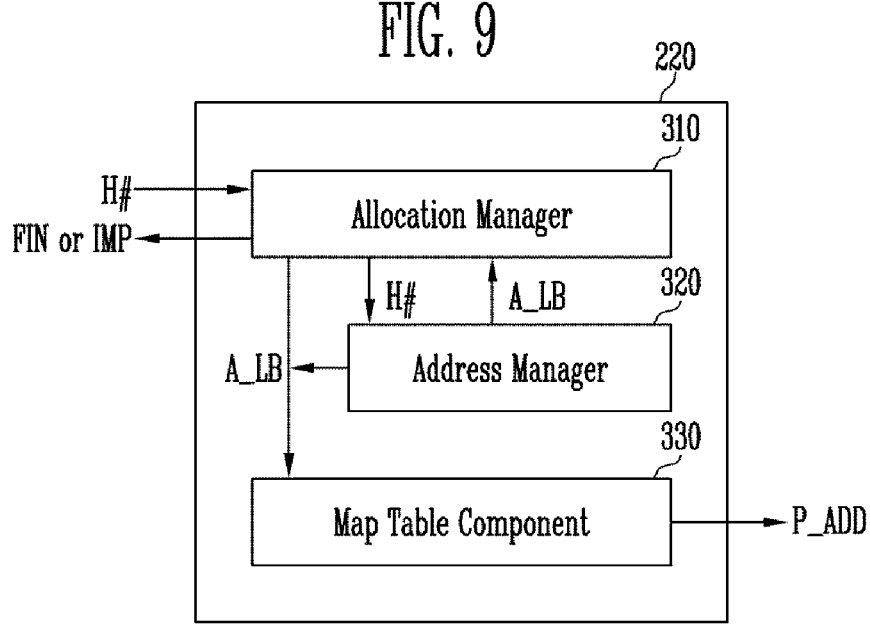
FIG. 9 is a diagram for describing an address allocator of FIG. 2.

FIG. 9 is a diagram for describing the address allocator of FIG. 2.

Referring to FIG. 9, the address allocator 220 may include an allocation manager 310, an address manager 320, and a map table component 330.

The allocation manager 310 may determine whether the host ID H # is the allocable ID. For example, when the memory allocation is impossible according to the host ID H #, the allocation manager 310 may output the allocation impossible signal IMP. When the memory allocation is possible according to the host ID H # and thus the memory allocation is completed by the allocation operation, the allocation manager 310 may output the allocation completion signal FIN. Whether or not the allocation is possible may be determined according to whether the host ID H # received from the host 2000 conforms to a host ID policy prescribed between the host 2000 and the memory system 1000, whether or not the capacity of the memory of which the allocation is requested is allocable capacity, or the like.

When the memory allocation is possible, the allocation manager 310 may transmit the host ID H # to the address manager 320, and the address manager 320 may perform the allocation operation using the host ID H # to allocate memory areas. An address of the allocated memory area may be output as an allocation address A_LB. When the allocation address A_LB is received, the allocation manager 310 may temporarily store the allocation address A_LB mapped to the host ID H # and output the allocation completion signal FIN. Here, the reason why the allocation address A_LB mapped to the host ID H # is temporarily stored is to reduce an operation time of the memory system 1000 by omitting the memory allocation operation and using stored log information since the allocation is requested again with the same capacity after the allocation of the allocated memory area is released. In addition, the allocation manager 310 may output the allocation address A_LB to the map table component 330 when the allocation of the memory area is completed.

When the address manager 320 receives the host ID H # from the allocation manager 310, the address manager 320 may perform the memory allocation operation to output the allocation address A_LB. For example, when the host ID H # is received, the address manager 320 may perform an operation using the host ID H # and output the allocation address A_LB based on values generated in the operation. The specific operation of the memory allocation operation performed by the address manager 320 will be described later.

The map table component 330 may include registers in which a map table in which the logical block address and the physical block address are mapped is stored. When the allocation address A_LB is received, the map table component 330 may select a physical block address P_ADD corresponding to the allocation logical block with reference to the map table stored in the registers, and output the selected physical block address P_ADD.

Figure 10:
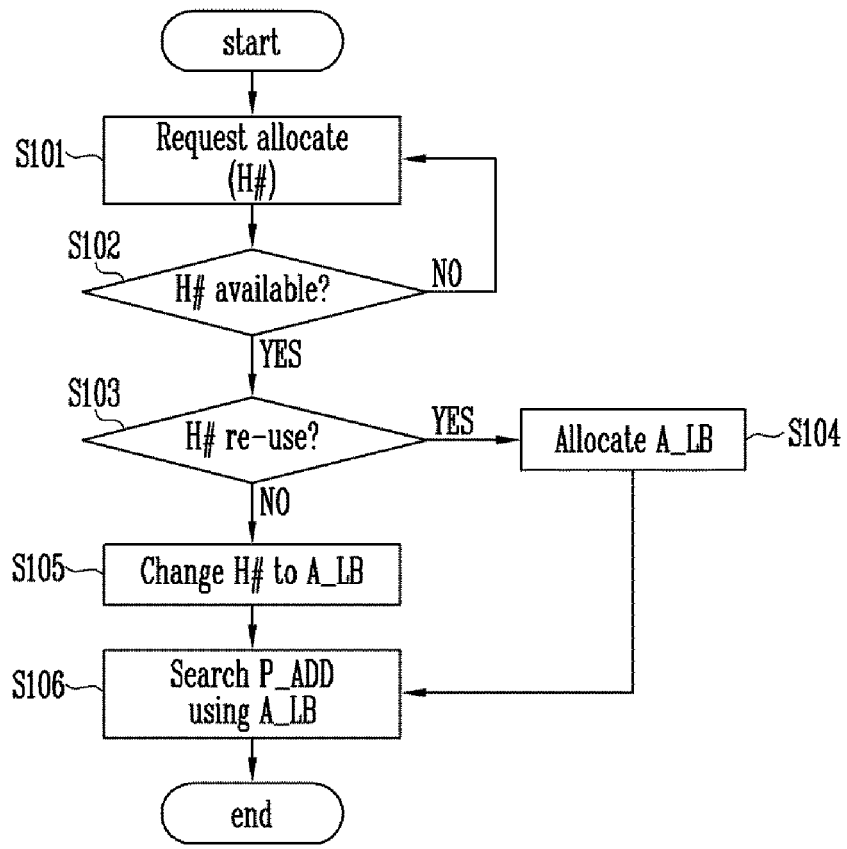
FIG. 10 is a flowchart for describing a memory allocation operation according to an embodiment of the present disclosure.

FIG. 10 is a flowchart for describing the memory allocation operation according to an embodiment of the present disclosure.

Referring to FIG. 10, the host 2000 may output the allocation request to the memory system 1000 together with the host ID H # corresponding to a required capacity (S101). There are various cases in which the host 2000 requests the memory allocation. For example, when securing a capacity required for the program operation, the host 2000 may request the memory allocation before outputting the program request. Alternatively, even when the memory area is divided into a plurality of areas to be used according to user's needs, the host 2000 may request the memory allocation. In addition, the host 2000 may request the memory allocation in various cases, such as a usage purpose or a usage method of the memory area.

The host 2000 may request the memory allocation as an ID type instead of a logical block address type. The host ID H # will be described below with reference to FIG. 13.

When the host 2000 outputs the host request and the host ID H # to the memory system 1000, the controller 1200 included in the memory system 1000 may determine whether the received host ID H # is suitable (H # available) (S102). When the host ID H # is not suitable for the memory system 1000 (NO), the controller 1200 may output the fail signal FA to the host 2000, and the host 2000 may change the host ID H # and output the host ID H # again (S101). When the received host ID H # is suitable for the memory system 1000 (YES), the controller 1200 may determine whether the host ID H # is an ID to be reused (S103). For example, the controller 1200 may check the log information and check whether an index the same as the received host ID H # is present. When the same index is present (YES), the controller 1200 may output the allocation address A_LB mapped to the corresponding index (S104). When it is determined in step S103 that the same index is not present (NO), the controller 1200 may perform the memory allocation operation to convert the host ID H # into the allocation address A_LB (S105).

The controller 1200 may search for the physical block address P_ADD using the allocation address A_LB (S106).

When the physical block address P_ADD is selected, the controller 1200 may access the storage device 1100 according to the physical block address P_ADD.

Figure 11:
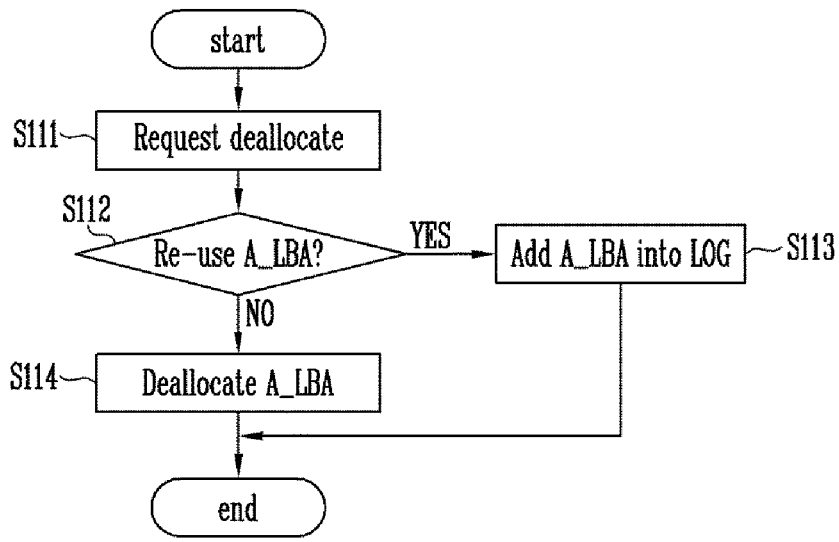
FIG. 11 is a flowchart for describing a de-allocation operation according to an embodiment of the present disclosure.

FIG. 11 is a flowchart for describing the de-allocation operation according to an embodiment of the present disclosure.

Referring to FIG. 11, when the de-allocation request is received from the host 2000 (S111), the controller 1200 may determine whether the allocation address A_LB is an address that may be reused (S112). The reuse or not may be determined according to whether the host ID H # received at the time of the allocation request has been received a reference number or more. For example, when the host ID H # is an ID that is frequently used at the time of the allocation request (YES), the controller 1200 may add the allocation address A_LB corresponding to the frequently used host ID H # to the log information so as to reduce the operation time (S113). The allocation address A_LB added to the log information may be directly output without a memory allocation operation when a corresponding host ID H # is received again at a time of a subsequent allocation request.

In step 'S112', when it is determined that the allocation address A_LB is an address that is not to be reused (NO), the controller 1200 may release the allocation address A_LB (S114).

Next, some of the configurations for configuring the address allocator 220 will be described.

Figure 12:
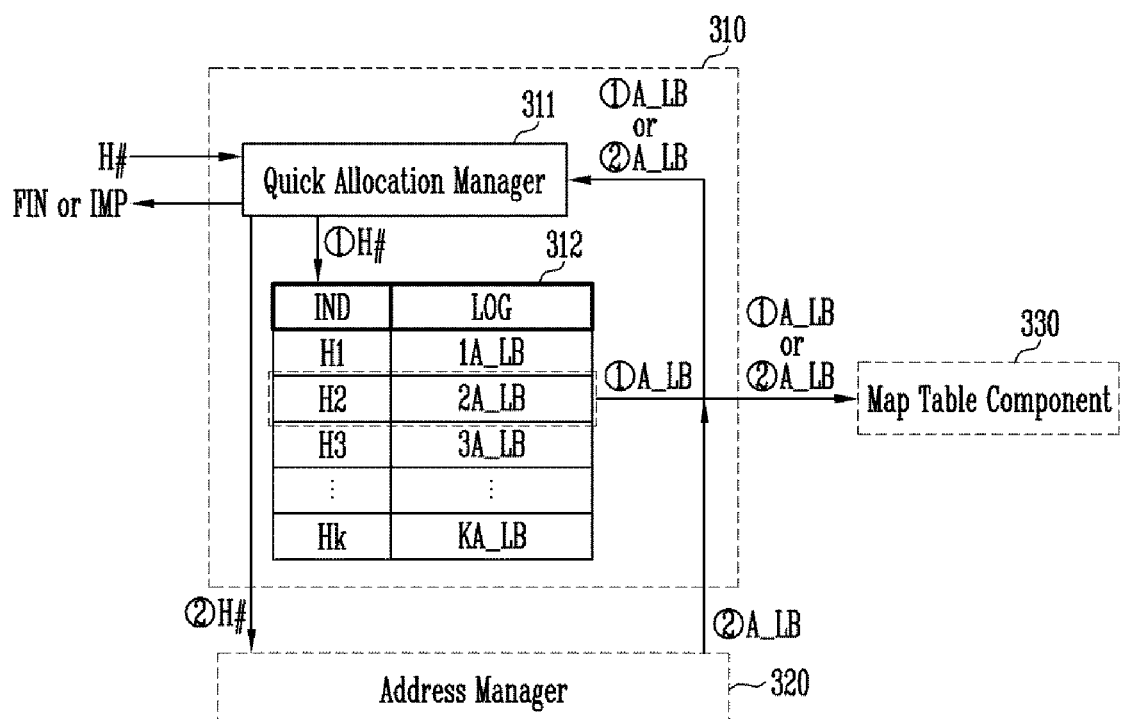
FIG. 12 is a diagram for describing an allocation manager of FIG. 9.

FIG. 12 is a diagram for describing the allocation manager of FIG. 9.

Referring to FIG. 12, the allocation manager 310 may include a quick allocation manager 311 and a log information register 312.

When the host ID H # is received, the quick allocation manager 311 may determine whether the host ID H # is a suitable ID for the memory system 1000. For example, when a capacity corresponding to the received host ID H # is larger than a capacity of the free memory blocks of the memory system 1000, the quick allocation manager 311 may output the allocation impossible signal IMP. When the capacity corresponding to the host ID H # is smaller than the capacity of the free memory blocks of the memory system 1000, the quick allocation manager 311 may first transmit the received host ID H #(1). When the index IND corresponding to the host ID H # is not present in the log information register 312, the quick allocation manager 311 may transmit the host ID H # to the address manager 320 (2). That is, when information corresponding to the received host ID H # is present in the log information register 312 (1), the allocation address A_LB may be directly output from the log table. When the information corresponding to the received host ID H # is not present in the log information register 312(2), the allocation address A_LB may be output from the address manager 320.

The log information register 312 may store a log table in which the host ID H # and the allocation address A_LB are mapped. For example, in the log information register 312, the host ID H # used at the time of a previous allocation operation may be stored as the index IND, and the allocation address A_LB corresponding to the host ID H # may be stored as the log information LOG. When the host ID H # is received from the quick allocation manager 311, the log information register 312 may check the index IND corresponding to the received host ID H #.

When the index IND corresponding to the received host ID H # is present in the index IND of the log information register 312 (CD), the log information register 312 may transmit the allocation address A_LB mapped to the corresponding index to the quick allocation manager 311 and the map table component 330. For example, in a case in which a host ID 2 H2 is included the index IND and an allocation address 2 2A_LB mapped to the host ID 2 H2 is included in the log information LOG, when the received host ID H # is '2', the allocation address 2 2A_LB mapped to the host ID 2 H2 may be transmitted to each of the quick allocation manager 311 and the map table component 330 as the allocation address A_LB.

When the index IND corresponding to the received host ID H # is not present in the index IND of the log information register 312 (2), the log information register 312 does not output the allocation address A_LB. When the allocation address A_LB is not output from the log information register 312 after the host ID H # is transmitted to the log information register 312 and then a predetermined time (preset time) is elapsed, the quick allocation manager 311 may transmit the host ID H # to the address manager 320. The address manager 320 receiving the host ID H # may perform the memory allocation operation to generate the allocation address A_LB and may transmit the generated allocation address A_LB to each of the quick allocation manager 311 and the map table component 330. The word "preset" and "predetermined" as used herein with respect to a parameter, such as a preset time and predetermined time, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Figure 13:
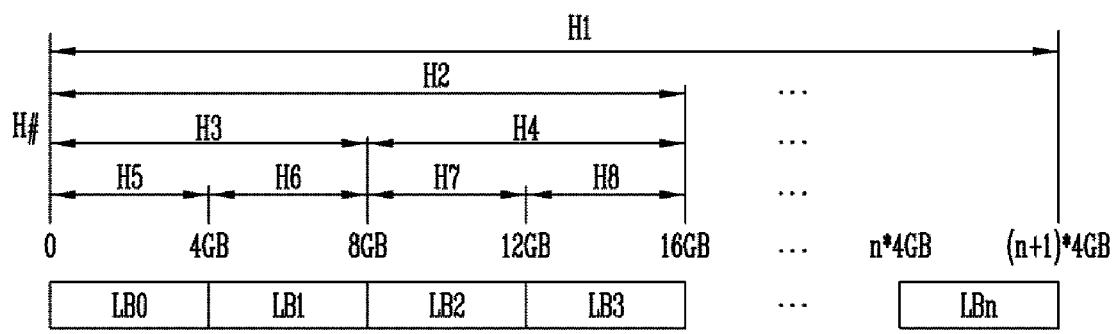
FIG. 13 is a diagram for describing a host ID and an allocation space.

FIG. 13 is a diagram for describing the host ID and the allocation space.

Referring to FIG. 13, the host ID H # may have various values according to an allocation capacity. For example, when the logical blocks are divided into 4 GB units, the host ID 1 H 1 may mean a logical block (n+1)*4 GB, and the host ID 2 H2 may mean a logical block having a capacity corresponding to ½ of the host ID 1 H1. Here, '*' sign means multiplication (×). For example, when it is assumed that the host ID 1 H1 corresponds to a capacity of 32 GB, the host ID 2 H2 may mean a logical block having a capacity corresponding to 16 GB, which is ½ of 32 GB. In the same example, each of host IDs 3 and 4 H3 and H4 may mean 8 GB corresponding to ½ of the host ID 2 H2, and each of host IDs 5 to 8 H5 to H8 may mean 4 GB corresponding to ½ of 8 GB.

Therefore, when the host 2000 desires to receive an allocation of a capacity of 8 GB, the host 2000 may output the host ID 3 H3 or the host ID 4 H4 to the memory system 1000.

As described above, since the host ID H # does not need much information such as the logical block address and the host ID H # itself means a capacity, the host ID H # may be formed of a very small number of bits. As an embodiment, when the memory capacity of the memory system 1000 is divided into eight logical block units, 'n' in 2n=8 may be the number of bits of the host ID H #. In this case, the host ID H # may be selected from 000, 001, 010, 011, 100, 101, 110, and 111. As another embodiment, when the memory capacity of the memory system 1000 is divided into eight logical block units, the memory capacity may be divided into four logical block units, that is, two groups, and the host ID H # may be set for each group. In this case, an allocation amount for the four logical blocks may be set with the first host ID, and an allocation amount for the remaining four logical blocks may be set with the second host ID. Here, the first host ID may be used as a main ID, and the second host ID may be used as a sub ID.

As described above, when the memory allocation amount is implemented as the host ID H #, the allocation request between the host 2000 and the memory system 1000 may be simplified.

The host 2000 may transmit the host ID H # corresponding to a required allocation amount to the memory system 1000 and the memory system 1000 may perform the operation using the received host ID H # to extract the logical block address according to an internal state of the memory system 1000.

FIG. 13 is a diagram for understanding a concept of the present disclosure. The host ID H # may be set in various methods by applying a concept of the host ID H # of FIG. 13. Therefore, those skilled in the art will understand that a number of the host ID H # described in the following embodiments may be different from a number of the host ID H # shown in FIG. 13 and capacities respectively allocated to the various host IDs H # may be variously set.

A method of mapping the physical block address to the logical block address according to the internal state of the memory system 1000 will be described below as follows.

Figure 14:
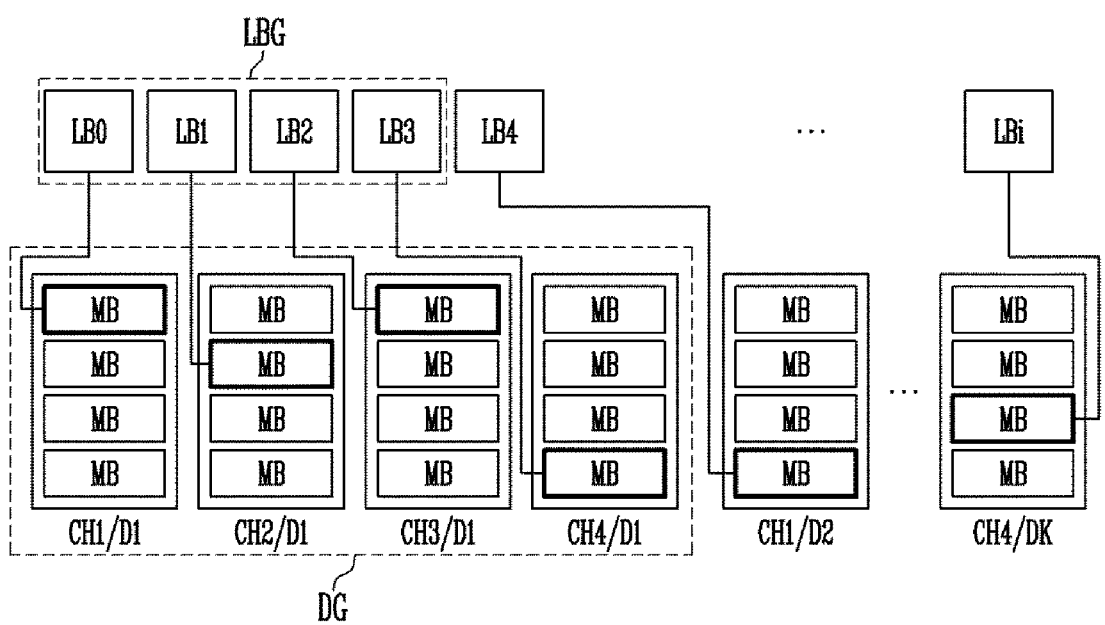
FIG. 14 is a diagram for describing a method of allocating a physical block matched with a logical block.

FIG. 14 is a diagram for describing a method of allocating the physical block matched with the logical block.

Referring to FIG. 14, logical blocks LB0 to LBi (i is a positive integer) may be grouped into a plurality of logical block groups LBG. The logical blocks included in each of the logical block groups LBG may be set to be respectively mapped to physical blocks MB that are capable of operating simultaneously with each other. For example, the controller 1200 may respectively map the logical blocks LB included in the same logical block group LBG to the physical blocks MB that are capable of operating simultaneously with each other. That is, the physical blocks MB that are capable of operating simultaneously with each other may be physical blocks MB included in dies connected to different channels CH or the same channel CH. For example, a die group DG mapped to the logical block group LBG may include dies connected to different channels. For example, when 0-th to third logical blocks LB0 to LB3 are included in the logical block group LBG, the 0-th logical block LB0 may be mapped to the physical block MB included in the first die D1 among the dies connected to the first channel CH1, the first logical block LB1 may be mapped to the physical block MB included in the first die D1 among the dies connected to the second channel CH2, the second logical block LB2 may be mapped to the physical block MB included in the first die D1 among the dies connected to the third channel CH3, and the third logical block LB3 may be mapped to the physical block MB included in the first die D1 among the dies connected to the fourth channel CH4, respectively. As described above, when the memory blocks MB of the first dies D1 connected to the different channels CH1 to CH4 are selected, since the selected memory blocks MB may be operate simultaneously, the operation time of the memory system 1000 may be reduced. FIG. 14 shows that the first dies D1 are selected in all of the first to fourth channels CH1 to CH4, but different dies included in the same channel may be selected. For example, the first to k-th die D1 to Dk of the 0-th channel CH0 may be mapped to the same logical block group LBG. That is, the allocated memory blocks may be grouped into super block, and may be operated as one block logically.

Next, a method of extracting the allocation capacity and the logical block address from the received host ID H # will be described.

Figure 15:
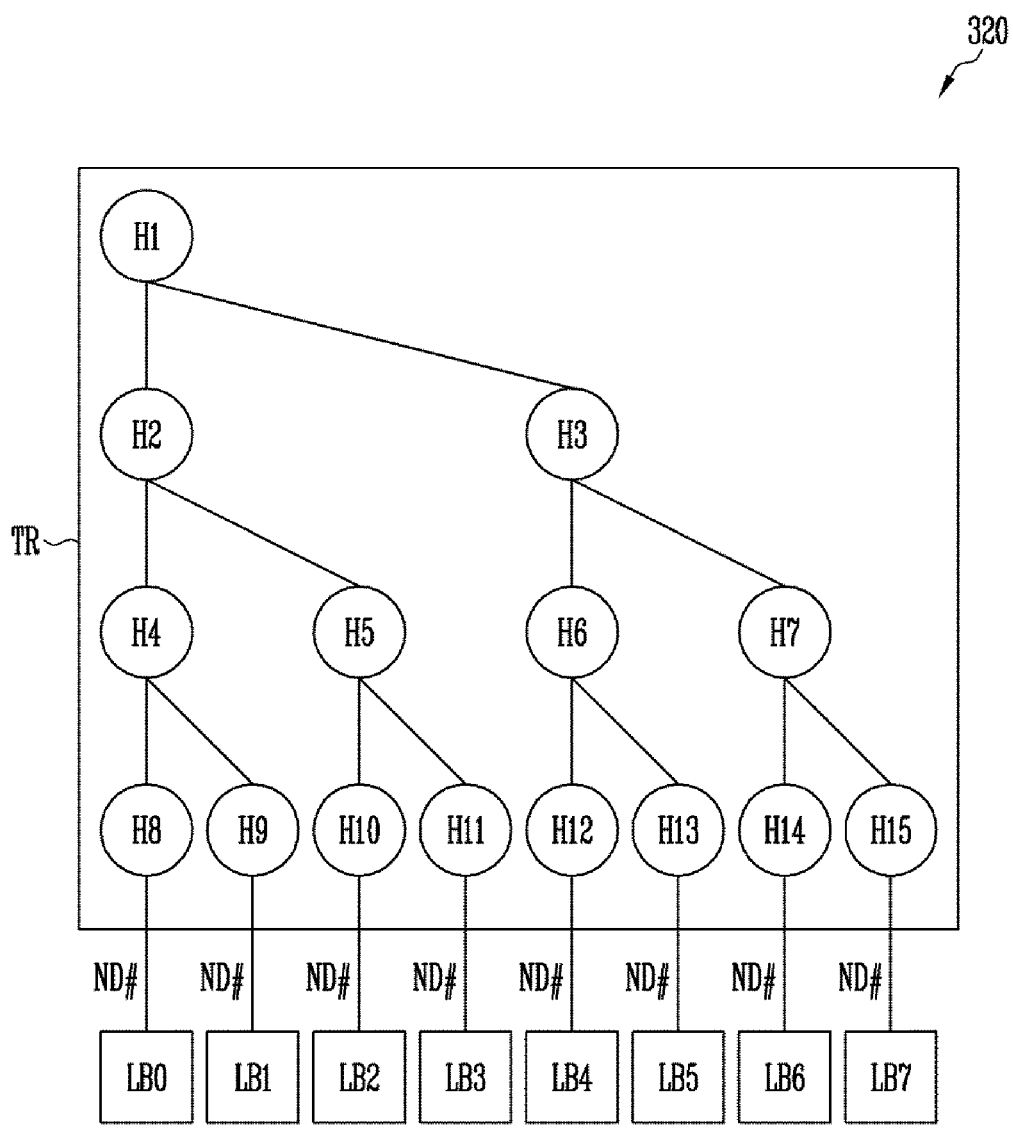
FIG. 15 is a diagram for describing a memory allocation method according to an embodiment of the present disclosure.

FIG. 15 is a diagram for describing a memory allocation method according to an embodiment of the present disclosure.

Referring to FIG. 15, the address manager 320 may perform an allocation operation of a method of a tree TR to extract information on a logical block address LB # and the allocation capacity from the host ID H #. For example, in the embodiments shown in FIG. 15, the host ID 1 H1 may correspond to the highest ID. According to an embodiment, a larger capacity may be allocated as an ID is a higher ID in the tree TR, and the number of the host IDs H # may be increased as the ID is a lower ID. The number of logical blocks allocated to the lower ID is less than that of the adjacent upper ID by ½.

For example, the host ID 1 H1 may be an ID that may receive an allocation of the eight logical blocks LB0 to LB7, and each of the host ID 2 H2 and the host ID 3 H3 may be ID that may receive an allocation of the logical blocks corresponding to ½ of the host ID 1 H1. For example, when it is assumed that the host ID 1 H1 corresponds to the 0-th to seventh logical blocks LB0 to LB7, the host ID 2 H2 may correspond to the 0-th to third logical blocks LB0 to LB3, and the host ID 3 H3 may correspond to the fourth to seventh logical blocks LB4 to LB7.

The host ID 2 H2 may include a host ID 4 H4 and a host ID 5 H5 as the lower ID, the host ID 4 H4 may correspond to the 0-th and first logical blocks LB0 and LB1, and the host ID 5 H5 may correspond to the second and third logical blocks LB2 and LB3.

The host ID 4 H4 may include a host ID 8 H8 and a host ID 9 H9 as the lower ID, the host ID 8 H8 may correspond to the 0-th logical block LB0, and the host ID 9 H9 may correspond to the first logical block LB1.

That is, the host IDs 8 to 15 H8 to H15 may correspond to the lowest IDs in the tree TR of FIG. 15 and may correspond to the logical blocks LB0 to LB7 of a minimum unit, respectively.

When the memory allocation operation is performed in the method of the tree TR as the embodiments of FIG. 15, the host 2000 may output the host ID H # corresponding to the required capacity, and the memory system 1000 may extract a node number ND # using the received host ID H #. Here, nodes may correspond to the logical blocks, respectively, and a start node and the number of nodes to be allocated may be extracted by the memory allocation operation. For example, when the host ID 2 H2 is received, in order to extract the 0-th to third logical blocks LB0 to LB3 corresponding to the host ID 2 H2, the address manager 320 may perform the memory allocation operation to extract a node number corresponding to the 0-th logical block LB0 as the start node and extract the number of nodes from the 0-th to third logical blocks LB0 to LB3. For example, when the number of nodes is extracted as four, since the extraction of the number of nodes as four means that four nodes are selected from the 0-th logical block LB0, which is the start node, the 0-th to third logical blocks LB0 to LB3 may be allocated. That is, the number of nodes may be the number of the allocated logical blocks, and the allocation capacity may be calculated according to the number of nodes.

As described above, the memory allocation operation using the host ID H # is performed to extract the start node and the number of nodes, and the logical blocks LB are allocated therefrom. Therefore, a separate storage space for storing the allocation capacity corresponding to each of the host IDs H # and the mapping information of the logical blocks is not required. Thus, a size of the controller 1200 may be reduced. In addition, since the host ID H # is implemented with bits less than that of the existing address method, the allocation operation of the controller 1200 may also be simplified.

Figure 16:
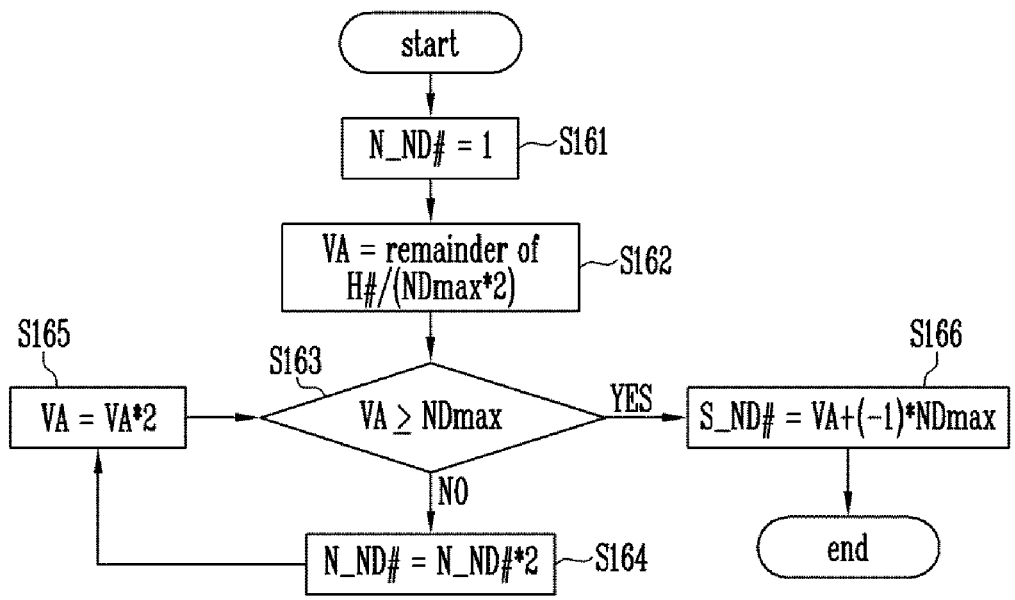
FIG. 16 is a flowchart for describing an example of an operation used in the memory allocation operation of FIG. 15.

FIG. 16 is a flowchart for describing an example of an operation used in the memory allocation operation of FIG. 15.

Referring to FIG. 16, when the host ID H # is received, the address manager 320 may calculate a start node S_ND # and the number of nodes N_ND # by performing the following operation.

Step S161

When the allocation operation is started, 1 is set as an initial value of the number of nodes N_ND #. That is, since the number of required nodes N_ND # is not known when the operation is started, 1 is set as the initial value of the number of nodes N_ND #. The number of nodes N_ND # may be calculated while the steps described later are performed.

Step S162

The host ID H # and a maximum number of nodes NDmax are calculated and a variable VA is calculated. Here, the maximum number of nodes NDmax may be a maximum number of nodes that may be allocated in one tree, and the variable VA may be used to calculate the number of nodes N_ND #. For example, the variable VA is a remainder obtained by dividing the host ID H # by a value obtained by multiplying the maximum number of nodes NDmax by 2. Therefore, the variable VA may be 0 or a positive integer. For example, when the host ID H # is 3 and the maximum number of nodes NDmax is 4, the variable VA is 3 since a quotient is 0 and the remainder is 3 in 3/(4×2) formula.

Step S163

The variable VA calculated in step S162 is compared with the maximum number of nodes NDmax so that it is determined whether the variable VA is equal to or greater than the maximum number of nodes NDmax. As a result of the comparison, when the variable VA is less than the maximum number of nodes NDmax (NO), step S164 is performed. When the variable VA is equal to or greater than the maximum number NDmax, step S166 is performed.

Step S164

A value obtained by multiplying the number of nodes N_ND # by 2 is set to a new number of nodes N_ND #.

Step S165

A value obtained by multiplying the variable VA by 2 is set to a new variable VA.

When the new variable VA is set, the new variable VA is compared with the maximum number of nodes NDmax again in step S163. In this manner, steps S163 to S165 are repeated until the variable VA is equal to or greater than the maximum number of nodes NDmax.

Step S166

The start node S_ND # is calculated as a sum of a negative value of the maximum number of nodes NDmax and the variable VA.

When the step S166 is completed, the allocation operation is ended, and the logical blocks may be selected according to the finally calculated number of nodes N_ND # and the start node S_ND # among the values calculated in the allocation operation, the address of the selected logical blocks may be used as the allocation address.

Various embodiments for calculating the start node S_ND # and the number of nodes N_ND # from the received host ID H # using the operation described in FIG. 16 will be described as follows.

Figure 17:
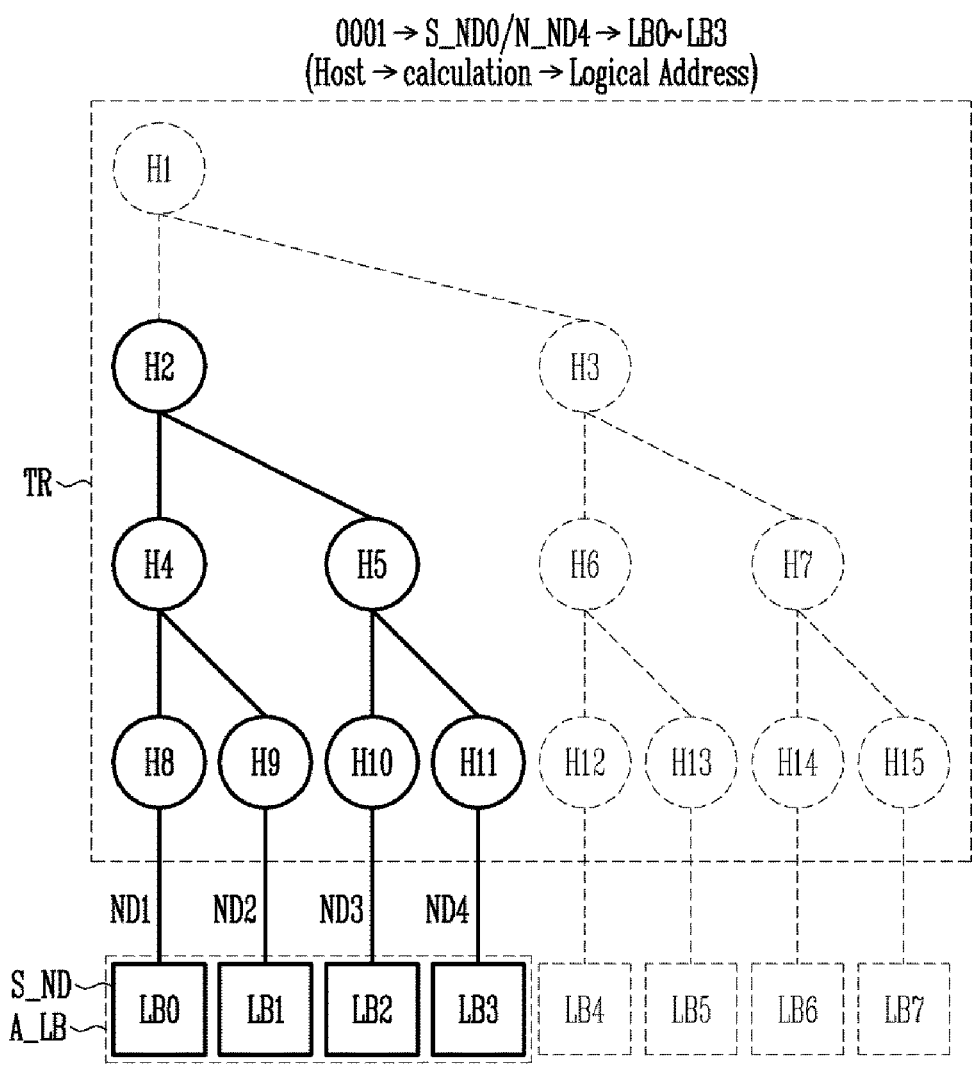
FIG. 17 is a first embodiment of the memory allocation operation to which the operation of FIG. 16 is applied.

FIG. 17 is a first embodiment of the memory allocation operation to which the operation of FIG. 16 is applied.

Referring to FIGS. 16 and 17, when the host ID H # received from the host 2000 is 2, the start node S_ND # and the number of nodes N_ND # corresponding to the host ID 2 H2 may be calculated.

In step S161, the number of nodes ND # is set to 1 as the initial value.

In step S162, the variable VA is calculated by performing the operation using the host ID H # and the maximum number of nodes NDmax. In the embodiments shown in FIG. 17, since the maximum number of nodes NDmax that may be allocated in one tree TR is eight (LB0 to LB7), the remainder is 2 according to 2/(8×2) operation. Therefore, the variable VA is 2.

In step S163, the variable VA is compared with the maximum number of nodes NDmax. Since the variable VA calculated in step S162 is 2 and the maximum number of nodes NDmax is 8, the variable VA is not equal to or greater than the maximum number of nodes NDmax (NO), and thus step S164 is performed.

In step S164, since the value obtained by multiplying the number of nodes N_ND # by 2 is the new number of nodes N_ND #, the new number of nodes N_ND # is 2 according to 1×2 formula.

In step S165, the value obtained by multiplying the variable VA by 2 is the new variable VA. Since the variable VA is calculated as 2 in step S162, the new variable VA is 4 according to 2×2 formula in step S165.

In step S163, the variable VA calculated in step S165 is compared with the maximum number of nodes NDmax. Since the variable VA is 4 and the maximum number of nodes NDmax is 8, step S164 is performed again.

In step S164, the number of nodes N_ND # is 4 according to 2×2 formula.

In step S165, the variable VA is 8 according to 4×2 formula.

In step S163, since the variable VA is 8 and the maximum number of nodes NDmax is 8, a condition 8=8 is satisfied (YES). Therefore, step S166 is performed.

In step S166, since the start node S_ND # is a value obtained by adding a value obtained by multiplying the maximum number of nodes NDmax by −1 to the variable VA, a value obtained by adding ((−1)×8) to 8 that is a final variable VA is 0. Therefore, the start node S_ND # is 0, and the final number of nodes N_ND # is 4.

In FIG. 17, since the logical block LB corresponding to 0 that is the start node S_ND is a logical block 0 LB0, four logical blocks LB0 to LB3 from the logical block 0 LB0 are selected according to 4 that is the number of nodes N_ND4. That is, when the host ID 2 H2 is received, logical block addresses for the four logical blocks LB0 to LB3 may be selected through the operation of FIG. 16, and the address manager 320 may output the selected logical block addresses as the allocation address A_LB.

A case in which a host ID H # different from that of FIG. 17 is received will be described as an example as follows.

Figure 18:
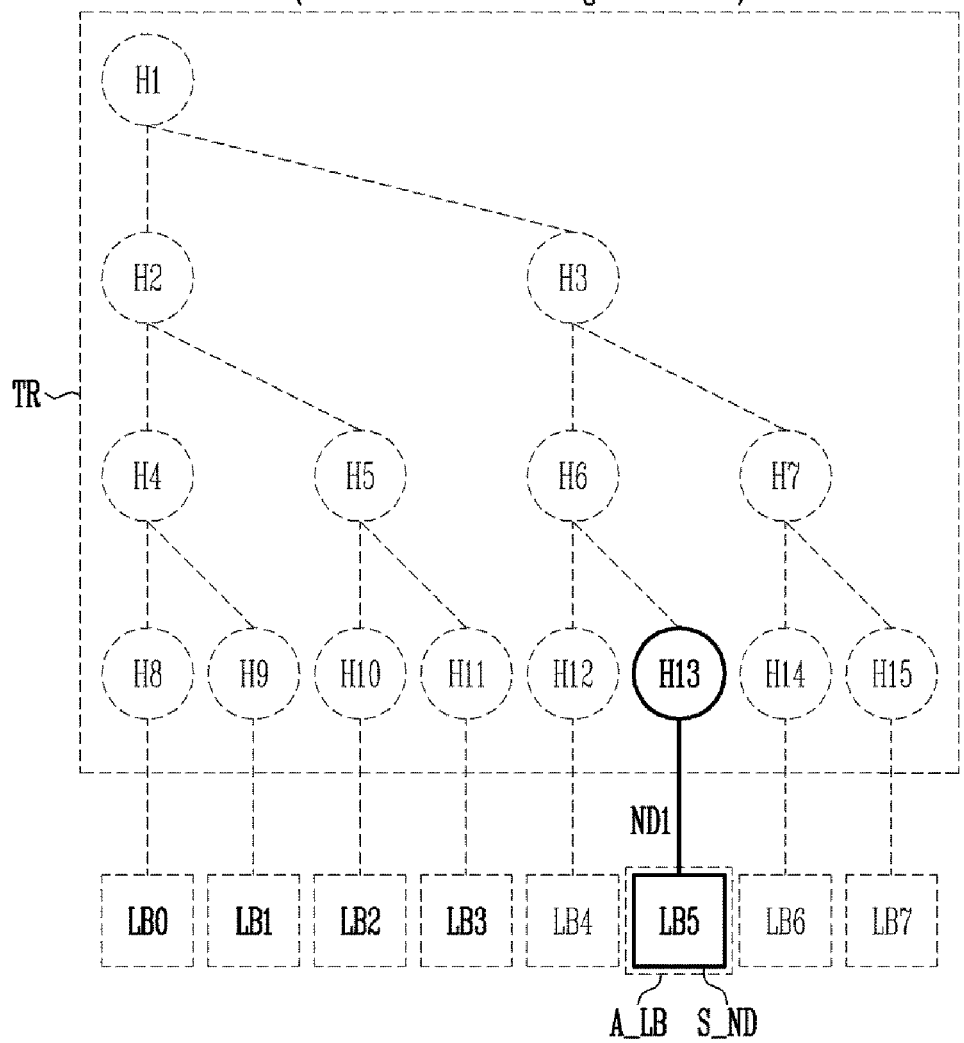
FIG. 18 is a second embodiment of the memory allocation operation to which the operation of FIG. 16 is applied.

FIG. 18 is a second embodiment of the memory allocation operation to which the operation of FIG. 16 is applied.

Referring to FIGS. 16 and 18, when the host ID H # received from the host 2000 is 13, the start node S_ND # and the number of nodes N_ND # corresponding to the host ID 13 H13 may be calculated.

In step S161, the number of nodes ND # is set to 1 as the initial value.

In step S162, the variable VA is calculated by performing the operation using the host ID H # and the maximum number of nodes NDmax. In an embodiment shown in FIG. 18, since the maximum number of nodes NDmax that may be allocated in one tree TR is eight (LB0 to LB7), the remainder is 13 according to 13/(8×2) operation. Therefore, the variable VA is 13.

In step S163, the variable VA is compared with the maximum number of nodes NDmax. The variable VA calculated in step S162 is 13 and the maximum number of nodes NDmax is 8. Therefore, since the variable VA is greater than the maximum number of nodes NDmax (YES), steps S164 and S165 are omitted and step S166 is performed.

In step S166, since the start node S_ND # is a value obtained by adding a value obtained by multiplying the maximum number of nodes NDmax by −1 to the variable VA, a value obtained by adding ((−1)×8) to 13 that is the variable VA is 5. Therefore, the start node S_ND # is 5, and the final number of nodes N_ND # is 1.

In FIG. 18, since the logical block LB corresponding to 5 that is the start node S_ND is a logical block 5 LB5, one logical block LB5 from the logical block 5 LB5 is selected according to 1 that is the number of nodes N_ND1. That is, when the host ID 13 H13 is received, a logical block addresses for the one logical block LB5 may be selected through the operation of FIG. 16, and the address manager 320 may output the selected logical block address as the allocation address A_LB.

FIGS. 16 to 18 illustrate an embodiment in which the logical blocks are operated by one tree. However, the logical blocks may be divided into a plurality of trees according to the storage device 1100. Other embodiments in which the logical blocks are operated by the plurality of trees will be described below as follows.

Figure 19:
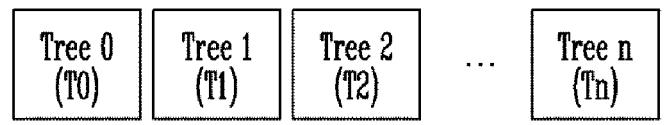
FIGS. 19 and 20 are diagrams for describing the memory allocation method according to another embodiment of the present disclosure.
Figure 20:
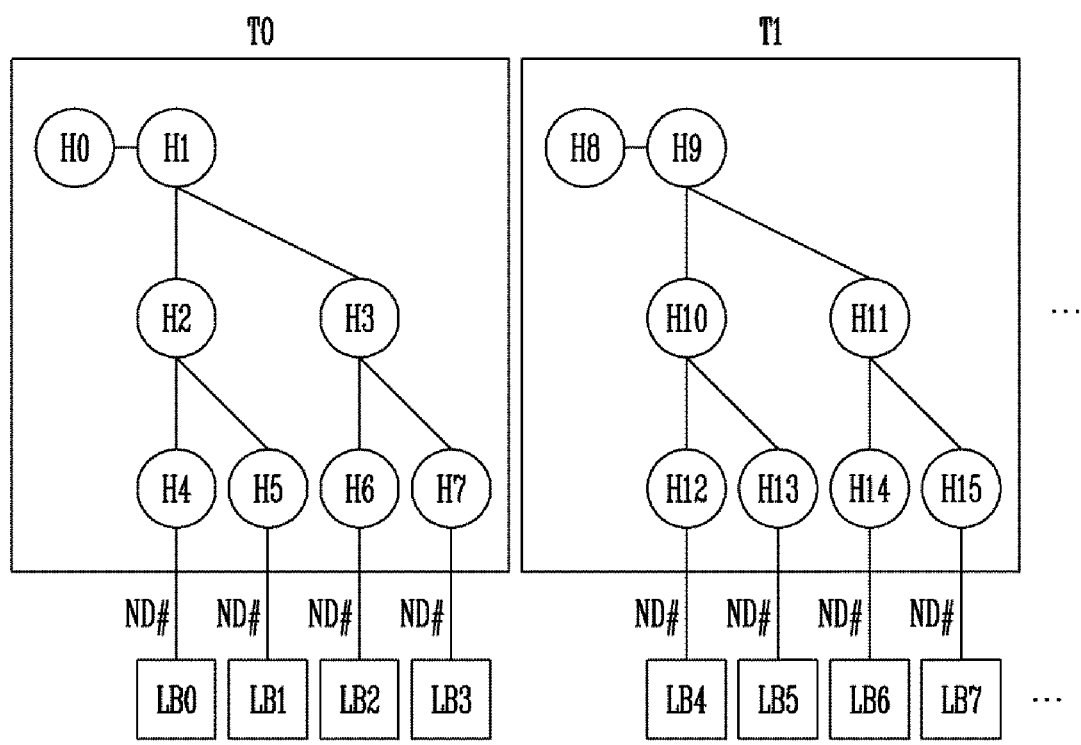

FIGS. 19 and 20 are diagrams for describing the memory allocation method according to another embodiment of the present disclosure.

Referring to FIGS. 19 and 20, the address manager 320 may group the logical blocks into 0-th to n-th trees Tree 0 to Tree n or T0 to Tn to perform the operation.

For example, when it is assumed that the maximum number of logical blocks that may be allocated in one tree is 4, the 0-th to third logical blocks LB0 to LB3 may be included in the 0-th tree T0, the fourth to seventh logical blocks LB4 to LB7 may be included in the first tree T1.

In a method in which the plurality of trees T0 to Tn are used as described above, a basic node may be added to each tree. For example, in the 0-th tree T0, the basic node may be a node corresponding to the host ID 0 H0, and in the first tree T1, the basic node may be a node corresponding to the host ID 8 H8. The basic nodes are not substantially used host IDs and may be used at the time of the de-allocation operation. The de-allocation operation using the basic node will be described later with reference to FIG. 28. The basic node may be set to a successive number from a last node of a previous tree. For example, when the host ID 7 H7 is the last node in the 0-th tree T0, the basic node may be a node corresponding to the host ID 8 H8 in the first tree T1.

Figure 21:
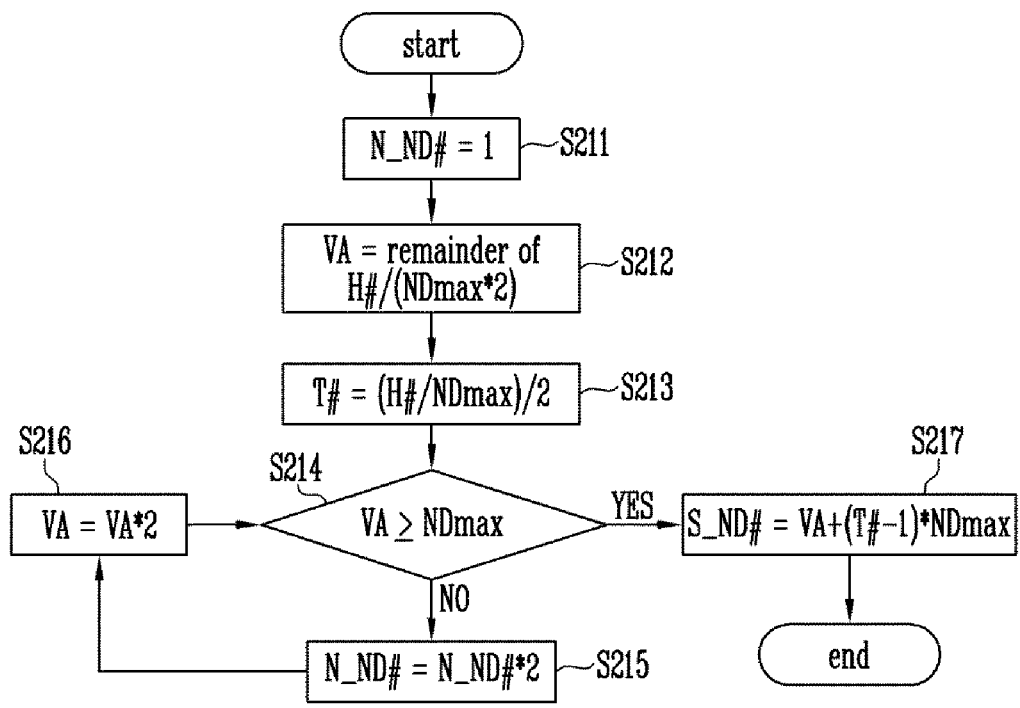
FIG. 21 is a flowchart for describing an example of the operation used in the memory allocation method of FIG. 20.

FIG. 21 is a flowchart for describing an example of the operation used in the memory allocation method of FIG. 20.

In FIG. 21, since the plurality of trees are included, an operation for calculating a tree number is added in comparison with the operation described above with reference to FIG. 16.

Referring to FIG. 21, when the host ID H # is received, the address manager 320 may perform the following operation to calculate a tree number T #, the start node S_ND #, and the number of nodes N_ND #.

Step S211

When the allocation operation is started, 1 is set as an initial value of the number of nodes N_ND #. That is, since the number of required nodes N_ND # is not known when the operation is started, 1 is set as the initial value of the number of nodes N_ND #. The number of nodes N_ND # may be calculated while the steps described later are performed.

Step S212

The host ID H # and the maximum number of nodes NDmax are calculated and the variable VA is calculated. Here, the maximum number of nodes NDmax may be a maximum number of nodes that may be allocated in one tree, and the variable VA may be used to calculate the number of nodes N_ND #. For example, the variable VA is a remainder obtained by dividing the host ID H # by a value obtained by multiplying the maximum number of nodes NDmax by 2. Therefore, the variable VA may be 0 or a positive integer. For example, when the host ID H # is 11 and the maximum number of nodes NDmax is 4, the variable VA is 3 since a quotient is 2 and the remainder is 3 in 11/(4×2) formula.

Step S213

In step S213, a value obtained by dividing the quotient obtained by dividing the host ID H # by the maximum number of nodes NDmax by 2 is the tree number T #. Therefore, the tree number T # may be 0 or a positive integer.

Step S214

The variable VA calculated in step S212 is compared with the maximum number of nodes NDmax so that it is determined whether the variable VA is equal to or greater than the maximum number of nodes NDmax. As a result of the comparison, when the variable VA is less than the maximum number of nodes NDmax (NO), step S215 is performed. When the variable VA is equal to or greater than the maximum number NDmax, step S217 is performed.

Step S215

A value obtained by multiplying the number of nodes N_ND # by 2 is set to a new number of nodes N_ND #.

Step S216

A value obtained by multiplying the variable VA by 2 is set to a new variable VA.

When the new variable VA is set, step S214 is performed again. In step S214, the new variable VA is compared with the maximum number of nodes NDmax again. In this manner, steps S214 to S216 are repeated until the variable VA is equal to or greater than the maximum number of nodes NDmax.

Step S217

The start node S_ND # is calculated as a value obtained by adding a value obtained by multiplying a value (T #-1) obtained by subtracting 1 from the tree number T # by the maximum number of nodes NDmax to the variable VA. That is, in step S217, a value obtained by calculating VA+(T #-1)×NDmax may be calculated as the start node S_ND #.

When the S217 step is completed, the allocation operation is ended, and the logical blocks may be selected according to the finally calculated tree number T #, number of nodes N_ND #, and start node (S_ND #) among the values calculated in the allocation operation. The address of the selected logical blocks may be used as the allocation address.

Various embodiments for calculating the tree number T #, the start node S_ND #, and the number of nodes N_ND # from the received host ID H # using the operation described in FIG. 21 will be described as follows.

Figure 22:
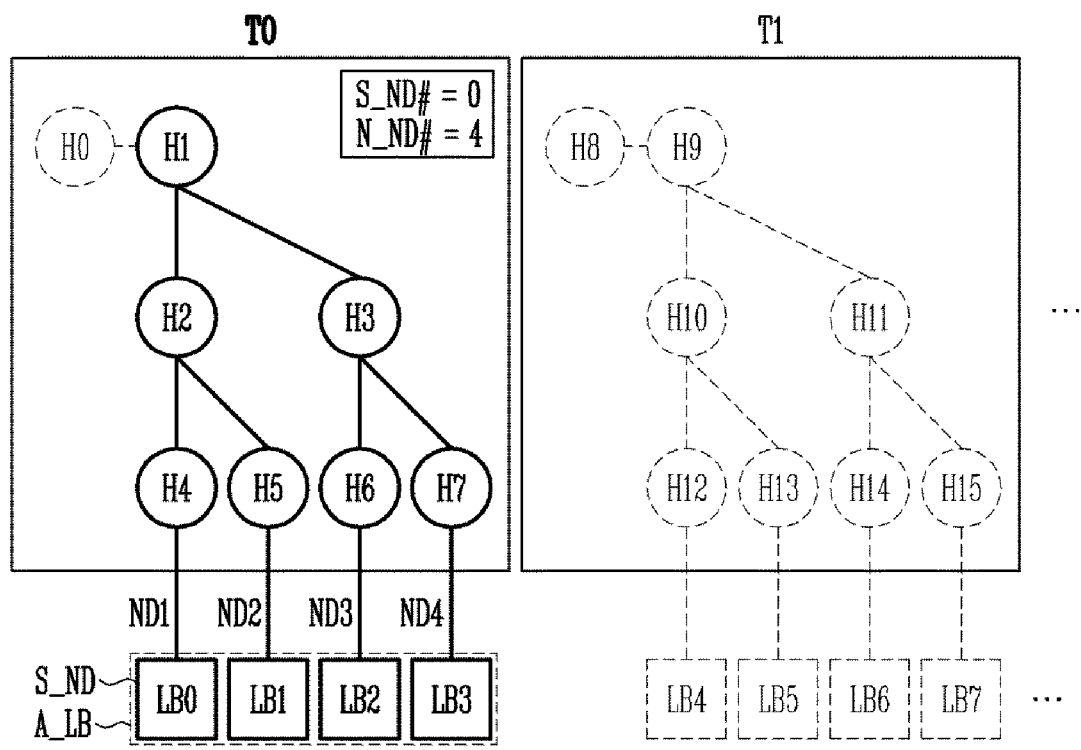
FIG. 22 is a diagram for describing a first embodiment of a memory allocation operation to which the operation of FIG. 21 is applied.

FIG. 22 is a diagram for describing a first embodiment of the memory allocation operation to which the operation of FIG. 21 is applied.

Referring to FIGS. 21 and 22, when the host ID H # received from the host 2000 is 1, the tree number T #, the start node S_ND #, and the number of nodes N_ND # corresponding to the host ID 1 H1 may be calculated.

In step S211, the number of nodes ND # is set to 1 as the initial value.

In step S212, the variable VA is calculated by performing the operation using the host ID H # and the maximum number of nodes NDmax. In an embodiment shown in FIG. 22, since the maximum number of nodes NDmax that may be allocated in each tree T0 or T1 is four, the remainder is 1 according to 1/(4×2) operation. Therefore, the variable VA is 1.

In step S213, the quotient obtained by dividing the host ID H # by the maximum number of nodes NDmax is divided by 2 again. The finally calculated quotient in formula of step S213 is the tree number T #. In an embodiment of FIG. 22, since the host ID H # is 1 and the maximum number of nodes NDmax is 4, 0 is calculated as a quotient of ¼, and a quotient obtained by dividing 0 by 2 is 0. Therefore, the tree number T # is 0. Thus, the 0-th tree T0 is selected.

In step S214, the variable VA is compared with the maximum number of nodes NDmax. Since the variable VA calculated in step S212 is 1 and the maximum number of nodes NDmax is 4, the variable VA is not equal to or greater than the maximum number of nodes NDmax (NO), and thus step S215 is performed.

In step S215, since the value obtained by multiplying the number of nodes N_ND # by 2 is the new number of nodes N_ND #, the new number of nodes N_ND # is 2 according to 1×2 formula.

In step S216, the value obtained by multiplying the variable VA by 2 is the new variable VA. Since the variable VA is calculated as 1 in step S216, the new variable VA is 2 according to 1×2 formula in step S216.

In step S214, the variable VA calculated in step S216 is compared with the maximum number of nodes NDmax. Since the variable VA is 2 and the maximum number of nodes NDmax is 4, step S215 is performed again.

In step S215, the number of nodes N_ND # is 4 according to 2×2 formula.

In step S216, the variable VA is 4 according to 2×2 formula.

In step S214, since the variable VA is 4 and the maximum number of nodes NDmax is 4, a condition 4=4 is satisfied (YES). Therefore, step S217 is performed.

In step S217, the start node S_ND # is a value obtained by adding a value obtained by multiplying a value (T #-1) obtained by subtracting 1 from the tree number T # by the maximum number of nodes NDmax to the variable VA. Therefore, a value obtained by adding (−1)×4 to 4 that is the variable VA is 0. Therefore, the start node S_ND # is 0, and the final number of nodes N_ND # is 4.

The tree number T #, the start node S_ND #, and the number of nodes ND # calculated according to the operation described above are 0, 0, and 4, respectively. Therefore, the logical blocks L0 to L3 included in the fourth logical block from the 0-th logical block LB0 included in the 0-th tree T0 by the host ID 1 H 1 may be selected. That is, when the host ID 1 H 1 is received, logical block addresses for the four logical blocks LB0 to LB3 may be selected through the operation of FIG. 21, and the address manager 320 may output the selected logical block address as the allocation address A_LB.

A case in which a host ID H # different from that of FIG. 22 is received will be described as an example as follows.

Figure 23:
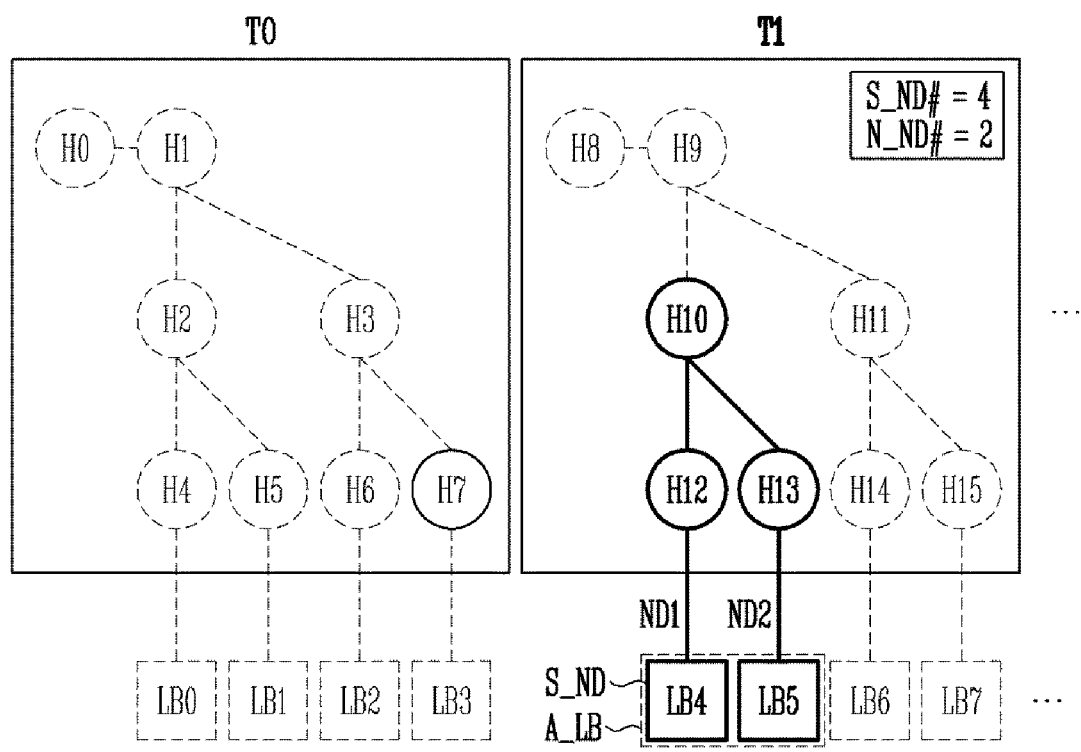
FIG. 23 is a diagram for describing a second embodiment of the memory allocation operation to which the operation of FIG. 21 is applied.

FIG. 23 is a diagram for describing a second embodiment of the memory allocation operation to which the operation of FIG. 21 is applied.

Referring to FIGS. 21 and 23, when the host ID H # received from the host 2000 is 10, the tree number T #, the start node S_ND #, and the number of nodes N_ND # corresponding to the host ID 10 H10 may be calculated.

In step S211, the number of nodes ND # is set to 1 as the initial value.

In step S212, the variable VA is calculated by performing the operation using the host ID H # and the maximum number of nodes NDmax. In an embodiment shown in FIG. 23, since the maximum number of nodes NDmax that may be allocated in each tree TR0 or TR1 is four, the remainder is 2 according to 10/(4×2) operation. Therefore, the variable VA is 2.

In step S213, the tree number T3 is calculated by operating the host ID H # and the maximum number of nodes NDmax. Since the quotient is 1 according to (10/4)/2 formula, the tree number T # is 1.

In step S214, the variable VA is compared with the maximum number of nodes NDmax. Since the variable VA calculated in step S212 is 2 and the maximum number of nodes NDmax is 4, the variable VA is less than the maximum number of nodes NDmax (NO). Therefore, step S215 is performed.

In step S215, since the value obtained by multiplying the number of nodes N_ND # by 2 is the new number of nodes N_ND #, the new number of nodes N_ND # is 2 according to 1×2 formula.

In step S216, a value obtained by multiplying the variable VA by 2 is the new variable VA. Since the variable VA is calculated as 2 in step S212, the new variable VA is calculated as 4 according to 2×2 formula in step S216.

In step S214, the variable VA calculated in step S216 is compared with the maximum number of nodes NDmax. Since the variable VA is 4 and the maximum number of nodes NDmax is 4, the condition of 4=4 is satisfied (YES). Therefore, step S217 is performed.

In step S217, the start node S_ND # is the value obtained by adding the value obtained by multiplying the value obtained by subtracting 1 from the tree number T # by the maximum number of nodes NDmax to the variable VA. Therefore, a value obtained by adding (1-1)×4 to 4 that is the variable VA is 4. Thus, the start node S_ND # is 4, and the final number of nodes N_ND # is 2.

The tree number T #, the start node S_ND #, and the number of nodes ND # calculated according to the operation described above are 1, 4, and 2, respectively. Therefore, the logical blocks L4 and L5 included in the second logical block from the fourth logical block LB4 included in the first tree T1 by the host ID 10 H10 may be selected.

That is, when the host ID 10 H10 is received, logical block addresses for the two logical blocks LB4 and LB5 may be selected through the operation of FIG. 21, and the address manager 320 may output the selected logical block address as the allocation address A_LB.

In the embodiments described above, when the host 2000 outputs one host ID H #, the controller 1200 of the memory system 1000 performs the allocation operation using the received host ID H # to select the logical blocks.

In the following embodiments, a method in which the host 2000 outputs a plurality of host IDs, and accordingly, the controller 1200 selects the logical blocks is described.

Figures 24, 25, 26:
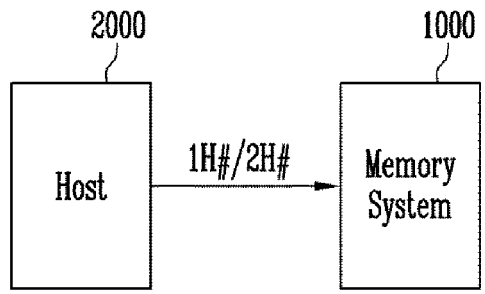
FIG. 24 is a diagram for describing a host ID policy for requesting memory allocation from a host to a memory system.
FIG. 25 is a diagram for describing embodiments of the host ID policy of FIG. 24.
FIG. 26 is a diagram for describing an embodiment of a second host ID policy among the embodiments described with reference to FIG. 25.

FIG. 24 is a diagram for describing a host ID policy for requesting the memory allocation from the host to the memory system.

Referring to FIG. 24, when the host 2000 requests the memory allocation to the memory system 1000, the host 2000 may output two or more host IDs 1H # and 2H # according to a host ID policy to request the memory allocation. The host ID policy may include information on the capacity of the logical block, the number of the tree, the number of the host IDs, and the like, and such information may be shared with the host 2000 and the memory system 1000. The host 2000 may request the allocation or request the de-allocation to the memory system 1000 according to the host ID policy shared with the memory system 1000. FIG. 24 shows an embodiment in which the host 2000 outputs the two host IDs 1H # and 2H # to the memory system 1000, and the number of the host IDs is changeable according to an embodiment.

The host 2000 outputs the first and second host IDs 1H # and 2H # as different IDs so that the logical blocks are not repetitively allocated. The memory system 1000 may perform allocation operations respectively using the first host ID 1H # and the second host ID 2H # to select logical blocks allocated to the respective host IDs. For example, the memory system 1000 may select the logical blocks allocated according to an operation result using the first host ID 1H #, and may select the logical blocks allocated according to an operation result using the second host ID 2H #.

FIG. 25 is a diagram for describing embodiments of the host ID policy of FIG. 24.

Referring to FIG. 25, the host 2000 and the memory system 1000 may divide the storage capacity of the memory system 1000 into one or a plurality of logical blocks according to a preset host ID policy, and may perform the memory allocation operation according to the host ID policy. Alternatively, on the contrary, the storage capacity of the memory system 1000 may be divided into one or a plurality of logical blocks, and the host ID policy may be set accordingly. The word "preset" as used herein with respect to a parameter, such as a preset host ID policy, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

For example, under a first host ID policy 1, the host 2000 may request the allocation to the memory system 1000 using one host ID, under a second host ID policy 2, the host 2000 may request the allocation to the memory system 1000 using two different host IDs, and under a third host ID policy 3, the host 2000 may request the allocation to the memory system 1000 using three different host IDs. In a policy using a plurality of host IDs such as the second or third host ID policy 2 or 3, allocable capacities may be set differently for the respective host IDs. For example, in the second host ID policy 2, the capacity that may be allocated to the first host ID 1H # and the capacity that may be allocated to the second host ID 2H # may be the same as 16 GB. As another example, in the third host ID policy 3, the capacity that may be allocated to the first host ID 1H # may be set as 16 GB and the capacity that may be allocated to the second and third host IDs 2H # and 3H # may be set as 8 GB equally.

To this end, the host 2000 and the memory system 1000 share the host ID policy with each other. For example, since different memory systems 1000 may have different allocable total capacities, the host ID policy may be preferentially set in the memory system 1000. For example, when the memory system 1000 and the host 2000 are connected to each other, the host 2000 may request various kinds of policy information to the memory system 1000, and the memory system 1000 may transmit the policy information applied to various operations to the host 2000 according to the request of the host 2000. At this time, the host ID policy set in the memory system 1000 may be transmitted to the host 2000. The host 2000 may generate the host ID corresponding to a required allocation capacity according to the host ID policy transmitted from the memory system 1000 and output the generated host ID to the memory system 1000.

FIG. 26 is a diagram for describing an embodiment of the second host ID policy among the embodiments described with reference to FIG. 25.

Referring to FIG. 26, when it is assumed that the capacity of one logical block LB is 4 gigabytes, all logical blocks selected according to the first host ID 1H # and the second host ID 2H # may be allocated. For example, when the first host ID 1 H1 and the second host ID 10 H10 are received, the address manager 320 of the controller 1200 may perform the allocation operation to select the four logical blocks LB0 to LB3 corresponding to the first host ID 1 H1 and the two logical blocks LB4 and LB5 corresponding to the second host ID 10 H10. Since the capacity of the four logical blocks LB0 to LB3 is 16 GB and the capacity of the two logical blocks LB4 and LB5 is 8 GB, the host 2000 requests memory allocation of 24 GB. In addition, the host 2000 may use different host IDs even though the same capacity allocation is requested. For example, differently from the embodiments described above, the host 2000 may output the first host ID 2 H2 and the second host ID 9 H9 for memory allocation of 24 GB. In this case, the address manager 320 may perform the allocation operation to select the two logical blocks LB0 and LB1 corresponding to the first host ID H2 and the four logical blocks LB4 to LB7 corresponding to the second host ID 9 H9.

Figure 27:
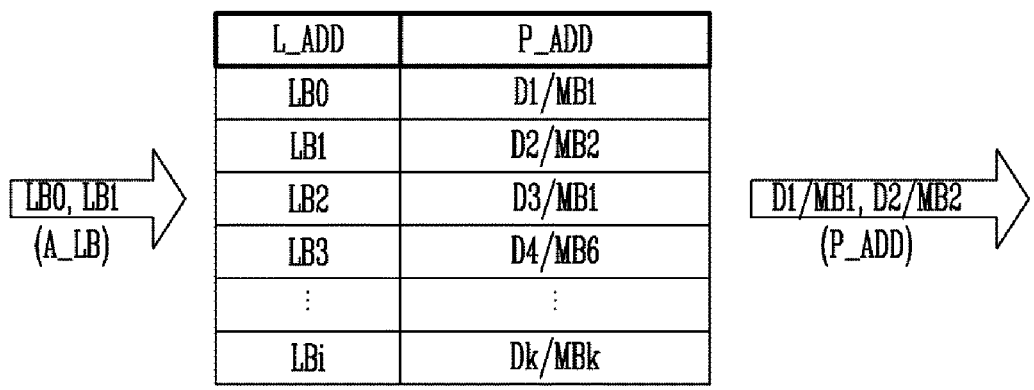
FIG. 27 is a diagram for describing an operation of a map table component of FIG. 9.

FIG. 27 is a diagram for describing an operation of the map table component of FIG. 9.

Referring to FIG. 27, when the address manager 320 outputs the allocation address A_LB as described above, the map table component 330 may output the physical block address P_ADD mapped to the allocation address A_LB. To this end, the map table component 330 may include a register for storing a map table in which the logical block address L_ADD and the physical block address P_ADD are mapped.

The logical block address L_ADD of the map table may include the logical block address according to the host ID policy, and the physical block address P_ADD may include the address of the allocable memory blocks among the memory blocks included in the storage device 1100. In particular, the physical block address P_ADD may be mapped to an address at which the logical blocks included in the same tree may operate simultaneously, in consideration of a tree structure.

An operation of mapping the physical block address P_ADD to the logical block address L_ADD of the map table may be performed by the processor (210 of FIG. 2). However, in an embodiment, the physical block address P_ADD may be mapped to the logical block address L_ADD so that different physical blocks that are allocated according to the request of the host 2000 may operate simultaneously. Such an address mapping operation may be performed by the processor (210 of FIG. 2) included in the controller 1200. The processor 210 may frequently update the map table by mapping the physical block address P_ADD to the logical block address L_ADD according to a state of the free memory blocks of the storage device 1100. For example, the processor 210 may update the map table at a time of a background operation of the memory system 1000 including the processor 210, or may update the map table when the allocation request is received from the host 2000.

When the address manager 320 performs the allocation operation to output the address of the 0-th and first logical blocks LB0 and LB1 as the allocation address A_LB, the map table component 330 may output the first memory block MB1 of the first die D1 mapped to the 0-th logical block LB0 and the second memory block MB2 of the second die D2 mapped to the first logical block LB1 as the physical block address P_ADD from the stored map table.

In an described above, a method of calculating the start node S_ND #, the number of nodes ND #, and the tree number T # based on the host ID H # has been described. Next, a method of calculating the host ID H # based on the start node SND # will be described in contrast to an embodiment described above. The method may be used when calculating the host ID by using information on the allocated area at a time of operation such as the de-allocation.

Figure 28:
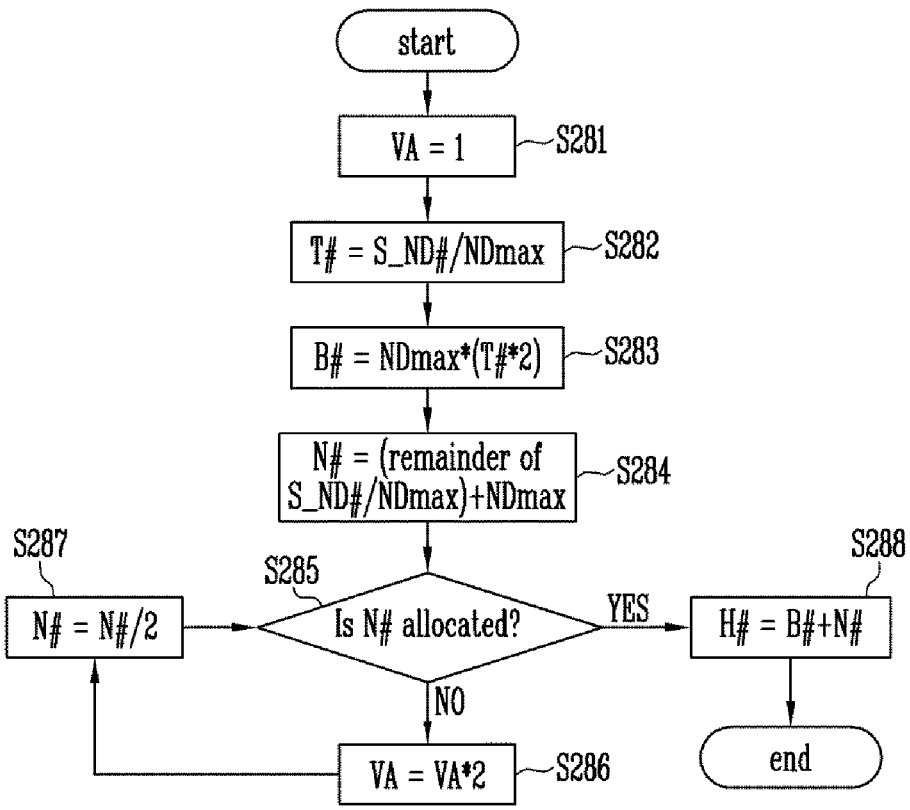
FIG. 28 is a flowchart for describing an example of an operation of calculating a host ID using a start node.

FIG. 28 is a flowchart for describing an example of an operation of calculating the host ID using the start node.

Referring to FIG. 28, the address manager 320 may calculate the host ID H # based on the start node S_ND # calculated by the above-described allocation operation.

Step S281

When the de-allocation operation is started, 1 is set as an initial value of the variable VA. The variable VA means the number of successive logical blocks that may be simultaneously processed.

Step S282

The start node S_ND # and the maximum number of nodes NDmax are calculated and thus the tree number T # is calculated. For example, the quotient obtained by dividing the start node S_ND # by the maximum number of nodes NDmax is the tree number T #.

Step S283

The basic node B # is calculated by multiplying the value obtained by multiplying the tree number T # calculated in step S282 by 2 by the maximum number of nodes NDmax. The basic node B # is the first host ID of each tree, and the host ID designated as the existing node is not used at the time of the memory allocation operation. That is, the basic node B # is used only in the de-allocation operation and is not used in the memory allocation operation.

Step S284

A node turn number N # is calculated by adding the remainder obtained by dividing the start node S_ND # by the maximum number of nodes NDmax to the maximum number of nodes NDmax. At the time of the de-allocation operation, the node turn N # is used to search for a number of the node to which the host ID H # corresponds from the basic node B # of the calculated tree number T #.

Step S285

It is determined whether the host ID H # of the calculated node turn N # is the allocated host ID.

When the host ID H # of the calculated node turn N # is not the allocated host ID (NO), step S286 is performed. When the host ID H # is the allocated host ID (YES), step S288 is performed.

Step S286

A value obtained by multiplying the variable VA by 2 is set as the new variable VA.

Step S287

A quotient obtained by dividing the node turn N # by 2 is set as a new node turn N #.

When the node turn N # is newly set, step S285 is performed again using the newly set node turn N #.

Step S288

When it is determined in step S285 that the host ID corresponding to the node turn N # is allocated (YES), a node calculated by adding the basic node B # and the node turn N # is the host ID H #.

An embodiment for calculating the host ID H # from the start node S_ND # using the operation described with reference to FIG. 28 will be described as follows.

Figure 29:
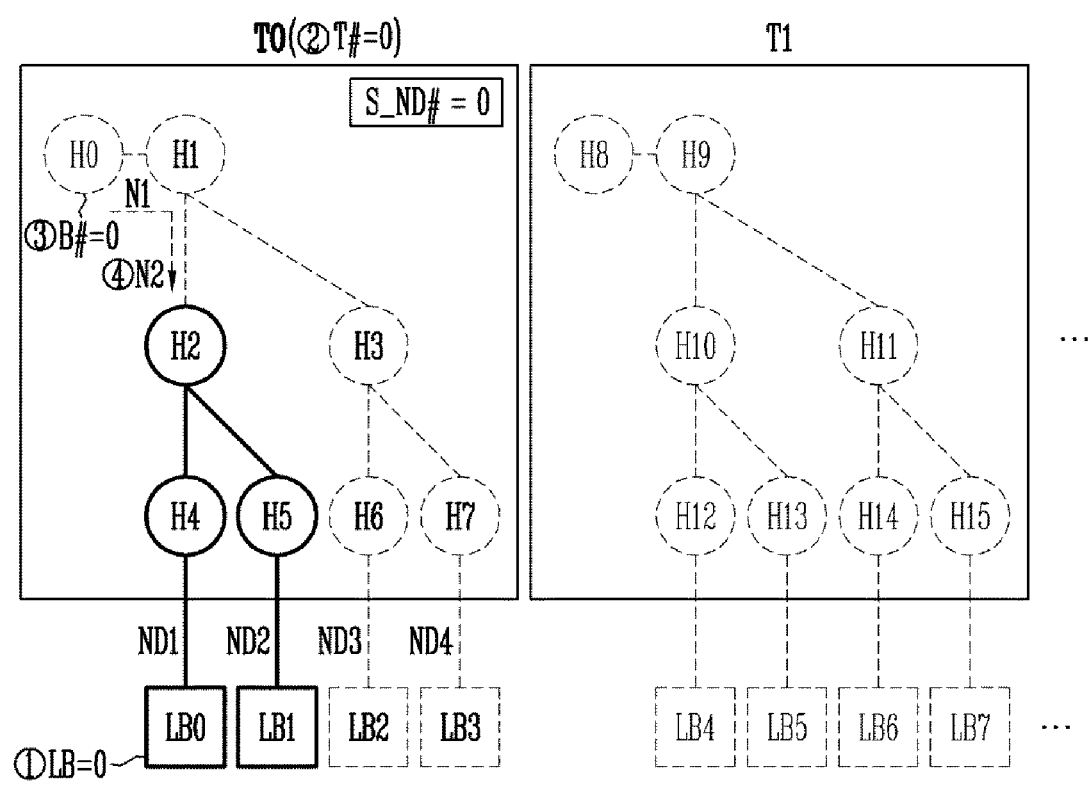
FIG. 29 is a diagram for describing an embodiment of a method of calculating the host ID to which the operation of FIG. 28 is applied.

FIG. 29 is a diagram for describing an embodiment of a method of calculating the host ID to which the operation of FIG. 28 is applied.

Referring to FIGS. 28 and 29, when the start node S_ND # is 0 LB0, the host ID H # may be calculated by applying the operation described with reference to FIG. 28.

In step S281, 1 is set as the initial value of the variable VA.

In step S282, an operation using the start node S_ND # and the maximum number of nodes NDmax is performed and thus the tree number T # is calculated. In an embodiment of FIG. 29, since the start node S_ND # is 0 (1) and the maximum number of nodes NDmax is 4, the quotient is 0 according to 0/4 operation. Therefore, the tree number T # is 0 (2).

In step S283, the value obtained by multiplying the value obtained by multiplying the tree number T # by 2 and the maximum number of nodes NDmax is the basic node B #. In an embodiment, since the tree number T # is 0, the basic node B # is 0 (3). That is, the host ID 0 H0 is the basic node B #.

In step S284, since the start node S_ND # is 0 and the maximum number of nodes NDmax is 4, the remainder obtained by dividing the start node S_ND # by the maximum number of nodes NDmax is 0. Since the value obtained by adding the maximum number of nodes NDmax to the remainder is the node turn N #, the node turn N # is 4 according to 0+4 operation.

In step S285, it is determined whether the host ID H # corresponding to the calculated node turn N # is an allocated ID. For example, since the calculated basic node B # is 0 and the node turn N # is 4, it is determined whether the host ID 4 H4 corresponding to a fourth node from the host ID 0 H0 is the allocated ID. Although the 0-th logical block LB0 is allocated to the host ID 4 H4, since it is determined that other logical blocks are allocated in addition to the 0-th logical block LB0 according to the number of currently allocated logical blocks (NO), step S286 is performed.

In step S286, the variable VA is multiplied by 2, and the new variable VA is 2.

In step S287, when the node turn N # is divided by 2, the quotient of the 4/2 operation is 2. Therefore, the new node turn N # is 2 (4).

In step S285, since the newly calculated node turn N # is 2, it is checked whether or not the host ID 2 H2 corresponding to a second node from the host ID 0 H0 corresponding to the basic node B #0 is allocated. Since the two logical blocks LB0 and LB1 are allocated to the host ID 2 H2, the number of the logical blocks is the same as the number of logical blocks currently allocated to the calculated tree number T #. When the number of allocated logical blocks is the same as described above (YES), step S288 is performed.

In step S288, when the basic node B # and the node turn N # are added together, the host ID 2 H2 is calculated according to 0+2 operation.

As described above, the host ID H # and the variable VA may be calculated using the starting node S_ND # of the allocated logical blocks and the number of logical blocks allocated in the selected tree. Such an operation may be used for outputting the host ID H # corresponding to the allocated logical blocks or searching for the host ID H # corresponding to the logical blocks allocated at the time of the operation (for example, a background operation) performed in the memory system. For example, when a block where an error occurs is detected when an operation such as garbage collection, read reclaim, bad block management, or wear-leveling is performed in the memory system, the above-described operation may be used for searching for the node number or host ID H # corresponding to the detected block. In addition, since the number of successive logical blocks that may be simultaneously processed may be grasped from the calculated variable VA, an operation such as address mapping may also be performed based on the number of successive logical blocks.

The controller 1200 that performs the above-described memory allocation operation and de-allocation operation may be applied to various memory systems as follows.

FIGS. 30 to 33 are diagrams for describing another embodiment of the memory system including the controller shown in FIG. 2.

Figure 30:
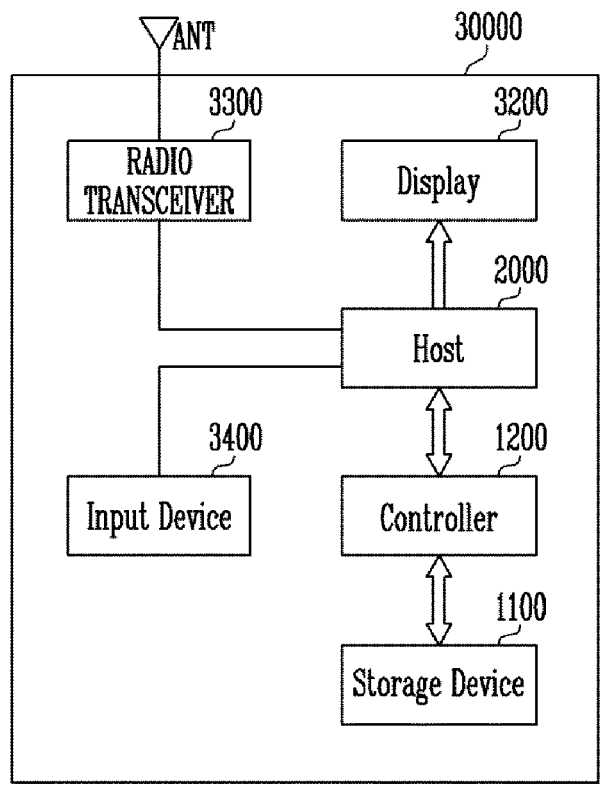
FIGS. 30 to 33 are diagrams for describing another embodiment of the memory system including the controller shown in FIG. 2.

Referring to FIG. 30, a memory system 30000 may be implemented as a cellular phone, a smartphone, a tablet PC, a personal digital assistant (PDA) or a wireless communication device.

The memory system 30000 may include the storage device 1100 and the controller 1200 capable of controlling the operation of the storage device 1100. The controller 1200 may control a data access operation, e.g., a program, erase, or read operation, of the storage device 1100 under the control of the host 2000.

Data programmed in the storage device 1100 may be output through a display 3200 under the control of the controller 1200.

A radio transceiver 3300 may transmit and receive radio signals through an antenna ANT. For example, the radio transceiver 3300 may convert a radio signal received through the antenna ANT into a signal that may be processed by the host 2000. Therefore, the host 2000 may process the signal output from the radio transceiver 3300 and transmit the processed signal to the controller 1200 or the display 3200. The controller 1200 may transmit the signal processed by the host 2000 to the storage device 1100. In addition, the radio transceiver 3300 may convert a signal output from the host 2000 into a radio signal, and output the converted radio signal to an external device through the antenna ANT. An input device 3400 may be a device capable of inputting a control signal for controlling the operation of the processor 3100 or data to be processed by the host 2000. The input device 3400 may be implemented as a pointing device such as a touch pad or a computer mouse, a keypad, or a keyboard. The host 2000 may control an operation of the display 3200 so that data output from the controller 1200, data output from the radio transceiver 3300, or data output from the input device 3400 is output through the display 3200.

Figure 31:
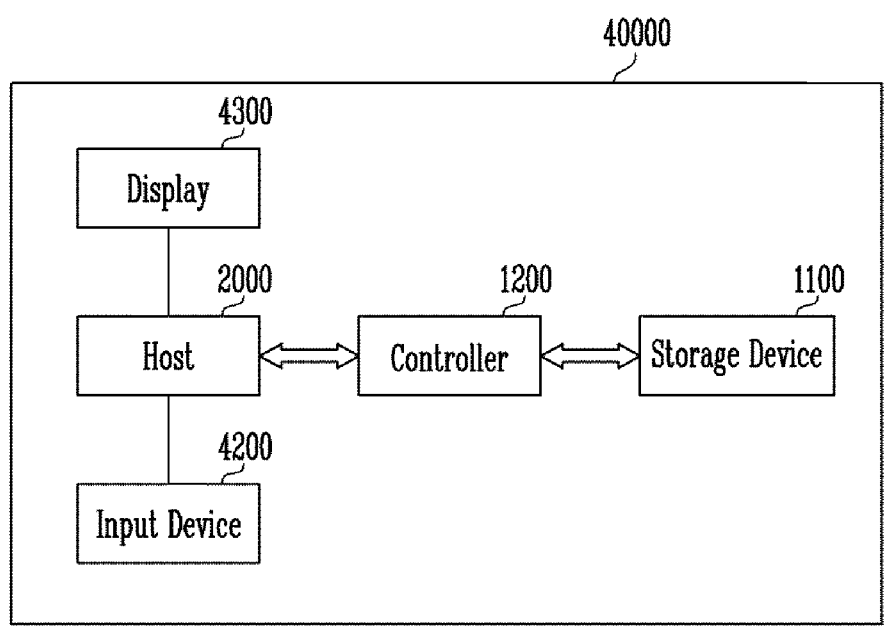

Referring to FIG. 31, a memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include the storage device 1100 and the controller 1200 capable of controlling a data process operation of the storage device 1100.

The host 2000 may output data stored in the storage device 1100 through a display 4300, according to data input through an input device 4200. For example, the input device 4200 may be implemented as a point device such as a touch pad or a computer mouse, a keypad, or a keyboard.

The host 2000 may control the overall operation of the memory system 40000 and control the operation of the controller 1200.

Figure 32:
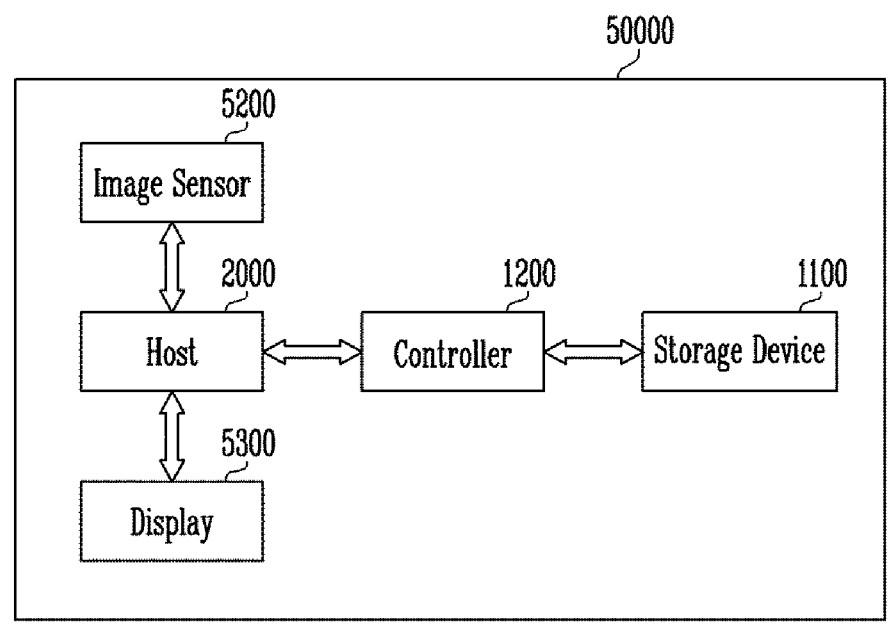

Referring to FIG. 32, a memory system 50000 may be implemented as an image processing device, e.g., a digital camera, a portable phone provided with a digital camera, a smartphone provided with a digital camera, or a tablet PC provided with a digital camera.

The memory system 50000 may include the storage device 1100 and the controller 1200 capable of controlling a data process operation, e.g., a program, erase, or read operation, of the memory device 1100.

An image sensor 5200 of the memory system 50000 may convert an optical image into digital signals. The converted digital signals may be transmitted to the host 2000. Under the control of the host 2000, the converted digital signals may be output through a display 5300 or stored in the storage device 1100 through the controller 1200. Data stored in the storage device 1100 may be output through the display 5300 under the control of the host 2000.

Figure 33:
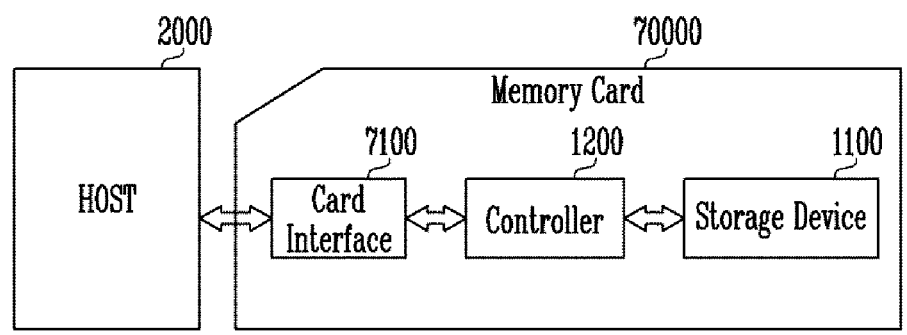

Referring to FIG. 33, a memory system may include the host 2000 and a memory card 70000.

The memory card 70000 may be implemented as a smart card. The memory card 70000 may include the storage device 1100, the controller 1200, and a card interface 7100.

The controller 1200 may control data exchange between the storage device 1100 and the card interface 7100. According to an embodiment, the card interface 7100 may be a secure digital (SD) card interface or a multi-media card (MMC) interface, but is not limited thereto. In addition, the card interface 7100 may interface data exchange between the host 2000 and the controller 1200 according to a protocol of the host 2000. According to an embodiment, the card interface 7100 may support a universal serial bus (USB) protocol, and an interchip (IC)-USB protocol. Here, the card interface 7100 may refer to hardware capable of supporting a protocol that is used by the host 2000, software installed in the hardware, or a signal transmission method.

Although the present disclosure describes many embodiments, various changes and modifications may be made without departing from the scope and technical spirit of the disclosure. Therefore, the scope of the present disclosure should not be limited to the above-described embodiments, but should be determined by the following claims and the equivalents of the claims of the present disclosure.

What is claimed is:

1. A controller comprising:
   a processor configured to receive an allocation request and a host identification host ID) output from a host;
   an address allocator configured to allocate a data storage area corresponding to at least a logical block address of the host ID; and
   a memory interface configured to access the data storage area in response to a physical block address corresponding to the logical block address,
   wherein the host ID indicates a requested allocate capacity of the data storage area, and
   wherein the address allocator calculates the logical block address by performing an allocation operation using the host ID, and calculates the host ID by performing a de-allocation operation using the logical block address.

2. The controller according to claim 1,
   wherein the requested allocate capacity of the data storage area is a number of logical blocks each of which the logical block address is allocated.

3. The controller according to claim 1,
   wherein logical blocks are divided according to a host ID policy.

4. The controller according to claim 3,
   wherein one or a plurality of host IDs are output from the host according to the host ID policy.

5. The controller according to claim 1,
   wherein the address allocator determines whether the host ID is an allocable ID according to whether the host ID conforms to a prescribed host ID policy or whether a capacity of a memory requested to be allocated is an allocable capacity.

6. The controller according to claim 4,
   wherein the host ID policy includes information on a capacity of the logical blocks, a number of trees, and a number of the host ID.

7. The controller according to claim 6,
   wherein the information is shared with the host and a memory system which includes the data storage area.

8. The controller according to claim 5,
   wherein the address allocator outputs an allocation impossible signal to the host when the host ID is determined as an unallocable ID, performs the allocation operation when the host ID is determined as the allocable ID, and outputs an allocation completion signal to the host when the allocation operation is completed.

9. The controller according to claim 8,
   wherein the address allocator performs the allocation operation based on a structure in which a plurality of identifications are connected in a tree among the trees.

10. The controller according to claim 9,
    wherein the tree includes a configuration in which a plurality of lower identifications correspond to a higher ID among the identifications.

11. The controller according to claim 10,
    wherein the host ID corresponding to a highest ID among the identifications corresponds to all logical blocks included in the tree, and the host ID corresponding to a lowest ID among the identifications corresponds to one of the logical blocks included in the tree.

12. The controller according to claim 1,
    wherein the physical block address mapped to the logical block address is updated according to a state of the data storage area.

13. A controller comprising:
    an address manager configured to select a logical block address corresponding to a host identification (host ID);
    a map table component configured to store a map table in which the logical block address and physical block addresses are mapped, wherein the physical block addresses correspond to a size of a memory, and the size of the memory is dynamically changed according to a host request; and
    an allocation manager determining whether or not the host ID is available and storing log information on a frequently used host ID more than a reference number.

14. The controller according to claim 13, wherein the allocation manager comprises:
    a log information register configured to store the log information; and
    a quick allocation manager configured to check whether the host ID is stored in the log information register, output the log information corresponding to the host ID when the host ID is present in the log information register, and transmit the host ID to the address manager when the host ID is not present in the log information register.

15. The controller according to claim 13,
    wherein the address manager calculates the logical block address by performing an allocation operation using the host ID, or calculates the host ID by performing a de-allocation operation using the logical block address.

16. The controller according to claim 13,
    wherein when the host requests the host ID, the address manager searches the logical block address corresponding to the host ID in the map table component.

17. A system comprising:
    a host configured to select a host identification (host ID) according to an allocation capacity, and output the host ID with an allocation request;
    a storage device including a plurality of memory blocks; and
    a controller configured to open free memory blocks, among the memory blocks, corresponding to the host ID when a capacity corresponding to the host ID is equal or less than allocable capacities of the memory blocks,
    wherein the controller calculates a logical block address by performing an allocation operation using the host ID, and calculates the host ID by performing a de-allocation operation using the logical block address.

18. The system according to claim 17,
    wherein the host ID is set for each capacity of logical blocks divided according to a host ID policy which includes information on each capacity of the logical blocks, a number of trees, and a number of the host ID, and the information is shared with the host and the controller.

\* \* \* \* \*